(12) United States Patent
Holman et al.

(10) Patent No.: US 12,134,070 B2
(45) Date of Patent: Nov. 5, 2024

(54) MECHANICAL VAPOR RE-COMPRESSOR HEAT PUMP FOR SEPARATING $CO_2$ FROM WATER VAPOR IN TEMPERATURE-VACUUM SWING ADSORPTION CYCLES

(71) Applicant: CARBON CAPTURE INC., Los Angeles, CA (US)

(72) Inventors: Brian Holman, Los Angeles, CA (US); David Wait, Los Angeles, CA (US); Mazdak Kebria, Los Angeles, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 18/484,776

(22) Filed: Oct. 11, 2023

(65) Prior Publication Data
US 2024/0115994 A1    Apr. 11, 2024

Related U.S. Application Data

(63) Continuation of application No. 18/484,222, filed on Oct. 10, 2023.
(Continued)

(51) Int. Cl.
  *B01D 53/02*   (2006.01)
  *B01D 53/04*   (2006.01)
  (Continued)

(52) U.S. Cl.
  CPC ....... *B01D 53/343* (2013.01); *B01D 53/0462* (2013.01); *B01D 53/0476* (2013.01); *B01D 53/62* (2013.01); *B01D 2257/504* (2013.01)

(58) Field of Classification Search
  CPC .............. B01D 53/343; B01D 53/0462; B01D 53/0476; B01D 53/62; B01D 2257/504
  See application file for complete search history.

(56) References Cited

U.S. PATENT DOCUMENTS

| | | | |
|---|---|---|---|
| 2,649,166 A | * | 8/1953 | Eck .............. B01D 53/62 95/166 |
| 4,425,142 A | | 1/1984 | Mann |

(Continued)

FOREIGN PATENT DOCUMENTS

| | | |
|---|---|---|
| KR | 20160035790 A | 4/2016 |
| WO | 2022/125717 A1 | 6/2022 |

OTHER PUBLICATIONS

Bos et al., "Production of high purity CO2 from air using solid amine sorbents", Chemical Engineering Science: X 2 (2019) 100020; pp. 1-11.
Li et al., "Steam-Stripping for Regeneration of Supported Amine-Based CO2 Adsorbents", Communications; D01: 10.1002/CSSC. 201000131; ChemSusChem 2010, 3, pp. 899-903.
(Continued)

*Primary Examiner* — Christopher P Jones
(74) *Attorney, Agent, or Firm* — RAPHAEL BELLUM PLLC

(57) ABSTRACT

Systems and methods for providing regeneration heat to a sorbent material and subsequently recovering a significant portion of the heat are provided. The systems and methods are useful, for example, for energy-efficient direct capture of carbon dioxide ($CO_2$) from the atmosphere or flue gases. The systems and methods include introducing steam generated by an evaporator into a reactor of the system to directly heat sorbent material in the reactor and to purge desorbed $CO_2$ from the reactor using the steam. Water condensing within the reactor is drained and returned to the evaporator. The purged steam and $CO_2$ from the reactor are directed to a vapor re-compressor to lift their temperature and then to a condenser or re-boiler where the water is condensed and separated from the $CO_2$ and latent heat transferred to the cooling water is recovered, optionally via use of a jet ejector.

15 Claims, 18 Drawing Sheets

Related U.S. Application Data

(60) Provisional application No. 63/378,764, filed on Oct. 7, 2022.

(51) Int. Cl.
 *B01D 53/047* (2006.01)
 *B01D 53/34* (2006.01)
 *B01D 53/62* (2006.01)

(56) References Cited

U.S. PATENT DOCUMENTS

| | | |
|---|---|---|
| 8,500,855 B2 | 8/2013 | Eisenberger |
| 8,911,536 B2 | 12/2014 | Chang |
| 10,279,306 B2 | 5/2019 | Gebald |
| 10,947,486 B1 | 3/2021 | Crawford et al. |
| 11,420,149 B2 | 8/2022 | Gebald |
| 2012/0125196 A1* | 5/2012 | Woodhouse ....... B01D 53/1475 95/193 |
| 2019/0388836 A1 | 12/2019 | Bumb et al. |

OTHER PUBLICATIONS

Song et al., "Design of a low-cost CO2 capture process based on heat integration technology", the 6th International conference on Applied Energy—ICAE2014; ScienceDirect, Energy Procedia 61 (2014) pp. 365-368.

Samanta et al., "Post-Combustion CO2 Capture Using Solid Sorbents: A Review"; Industrial & Engineering Chemistry Research, 2012, 51, pp. 1438-1463.

Wijesiri et al., "Desorption Process for Capturing CO2 from Air with Supported Amine Sorbent", Ind. Eng. Chem. Res. 2019, 58, pp. 15606-15618.

Schellevis et al., "Process optimization of a fixed bed reactor system for direct air capture", International Journal of Greenhouse Gas Control, 110, (2021) 103431, pp. 1-13.

Li et al., "Comparative desorption energy consumption of post-combustion CO2 capture integrated with mechanical vapor recompression technology", Separation and Purification Technology: 294 (2022), 121202, pp. 1-16.

Sanz-Perez et al., "Direct Capture of CO2 from Ambient Air", Chem. Rev. 2016, 116, pp. 11840-11876.

\* cited by examiner

MECHANICAL VAPOR RE-COMPRESSOR HEAT PUMP FOR SEPARATING CO₂ FROM WATER VAPOR IN TEMPERATURE-VACUUM SWING ADSORPTION CYCLES

CROSS-REFERENCE TO RELATED APPLICATIONS

This application is a Continuation of application Ser. No. 18/484,222, filed Oct. 10, 2023, which claims benefit of priority from U.S. Provisional Application No. 63/378,764 filed on Oct. 7, 2022, the entire contents of each are incorporated by reference.

TECHNICAL FIELD

The technology relates to systems and methods for energy-efficient direct capture and separation of gases. More specifically, the technology relates to systems and methods for energy-efficient direct capture and separation of carbon dioxide ($CO_2$) from the atmosphere or $CO_2$ point sources, such as flue gases. The use of mechanical vapor compression heat pumps allows significant amounts of process heat to be recovered and reused in each cycle, providing improved performance and greatly lowering the energy costs of the process.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas, and its concentration in the atmosphere has sharply increased over the past century due to the burning of fossil fuels. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

$CO_2$ capture processes commonly utilize some type of regenerable adsorbent bed to capture the $CO_2$ from a gas or air stream (see, for example, Sanz-Perez, et al., *Chemical Reviews*, 2016, 116, 11840-11876, which is incorporated in this disclosure in its entirety). A common approach basically involves a first step of moving ambient air or flue gas through a bed of a solid sorbent that is effective at selectively capturing a significant portion of the $CO_2$ contained therein. Once the sorbent reaches a level of significant saturation of $CO_2$, it needs to be regenerated in a second step. During regeneration, the adsorbent bed is treated with, for example, heat, vacuum, steam, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process. Moreover, additional energy is required to regenerate the sorbent, so the systems need to be highly efficient.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins (see, for example, Samanta, et al., *Industrial & Engineering Chemistry Research*, 2012, 51, 1438-1463, which is incorporated in this disclosure in its entirety). In some cases, the solid $CO_2$ sorbents are utilized in powder or pellet form in fluidized bed or packed bed configurations. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed.

The captured $CO_2$ is desorbed during the sorbent regeneration process, which usually involves heating or applying heat and vacuum to the adsorbent bed. This process is commonly known as temperature-vacuum swing (TVSA) adsorption and has been researched and reported in the literature (see, for example, Wijesiri, et al., *Industrial & Engineering Chemistry Research*, 2019, 58, 15606-15618 and Bos, et al., *Chemical Engineering Science: X*, 2019, 2, 100020, which is incorporated in this disclosure in its entirety). There is great interest in being able to heat the adsorbent beds quickly and efficiently to conserve energy and optimize cycle times. Thermal jackets or surface heaters are common heating methods but offer poor performance (cycle time) with the bulky adsorbent beds filled with insulative sorbent materials typically utilized for $CO_2$ capture. Some systems, such as those described in U.S. Pat. No. 10,279,306 or by Li, et al., *ChemSusChem*, 2010, 3, 899-903, which is incorporated in this disclosure in its entirety, seek to heat adsorbents without external heaters and utilize heat from steam, flowing steam through the adsorbent bed to efficiently transfer heat to the adsorbent. A particular version, known in the art as steam-assisted TVSA is often described as having several advantages. Steam is an effective carrier to sweep away gaseous $CO_2$ as it is being desorbed, thereby promoting increased desorption by way of reducing the partial pressure of the gas above the sorbent. The gaseous $CO_2$ can be conveniently separated by condensing the steam and allowing gravity to physically separate the condensed liquid.

The general steam-assisted TVSA process is often described in terms of a repetitive cycle, with each cycle comprising the following basic steps:

1. $CO_2$ Adsorption: Air is circulated over, through, or around the sorbent, which is contained inside a space that can be hermetically sealed. When adsorption is complete, the volume is sealed using valves.
2. Evacuation: Most of the residual air surrounding the sorbent (~80-99%) is evacuated to increase the purity of the recovered $CO_2$ and reduce the risk of potentially damaging the sorbent as a result of oxidation at higher temperatures.
3. Heating: The sorbent and surrounding structure are heated to a temperature chosen to promote optimum desorption of the $CO_2$, often >65° C. depending on the molecular structure of the sorbent.
4. Steam Purge/Regeneration: When the sorbent reaches the desired temperature, a steady flow of steam is initiated to remove $CO_2$ and regenerate the sorbent. The flow is controlled to effectively reduce the partial pressure of gaseous $CO_2$ as it is desorbed, which has the effect of increasing the amount removed.

5. Cooling: The sorbent and surrounding structure are cooled to near ambient temperature. At the end of cooling, the pressure of the surrounding space is equalized with atmospheric pressure by opening the valves maintaining the hermetic seal, thereby completing one cycle.

The steam-assisted TVSA cycle generally requires appreciable amounts of energy in the form of both mechanical energy and thermal energy. Thermal energy in the form of heat is needed to increase the temperature of the sorbent and surrounding structure (sensible heat) and to counteract the cooling inherent with the endothermic desorption process (heat of desorption). Thermal energy may also be required to generate the steam that sweeps out $CO_2$. Mechanical energy is primarily needed to move air through the sorbent in the adsorption step and to evacuate the residual air from the space surrounding the sorbent. Schevellis, et al., (*International Journal of Greenhouse Gas Control*, 2021, 110, 103431, which is incorporated in this disclosure in its entirety) have shown that sensible heat can account for much of the heat required in DAC.

U.S. Pat. No. 8,911,536, which is incorporated in this disclosure in its entirety discloses heating and cooling of a hydrophobic sorbent by way of direct contact with steam and liquid water, respectively. However, the invention does not disclose any means of recovering any of the heat used for regenerating the sorbent. U.S. Pat. No. 8,500,855, which is incorporated in this disclosure in its entirety, discloses the use of exogenous process heat, in particular the lower temperature heat remaining after generation of electricity from a higher temperature heat source, in the form of steam or in some other form that can be used to heat water to create steam that can be utilized to regenerate a sorbent. However, this methodology is only useful if there is a nearby source of waste process heat and there is no disclosure of any means of subsequently recovering any of the heat after it has been used for regenerating the sorbent.

Several methods have been developed to recover heat from the steam-assisted TVSA process. U.S. Pat. No. 10,279,306, which is incorporated in this disclosure in its entirety, discloses the basic approach of incorporating steam to assist in the desorption, which also embodies the use of either a heat pump or vapor re-compressor and kettle re-boiler to recover the heat of steam condensation for use in steam generation. The disadvantage of using a heat pump in the range of temperature of interest is the lack of practical working fluids for the heat pump. The heat pump would be limited to using certain hydrocarbons such as butane, which introduces extra costs for equipment to prevent or mitigate hazards associated with inhalation and fire. The reference also discloses a heat exchanger embedded in the sorbent structure, for indirectly heating and cooling the sorbent. The incorporation of an embedded heat exchanger adds cost, complicates fabrication, adds risk of unintended leakage of the heat transfer fluid, produces a non-uniform temperature distribution in the sorbent and surrounding structure, and makes removal and replacement of the sorbent more difficult and time consuming. Finally, the disclosure fails to disclose a means to recover the sensible heat needed to raise the temperature of the sorbent.

U.S. Pat. No. 11,420,149, which is incorporated in this disclosure in its entirety, discloses a means to capture and reuse heat using separate storage tanks, particularly stratified tanks having zones of different temperature. Several embodiments are disclosed for recovering the sensible heat used to heat the sorbent using various arrangements of direct and indirect heat exchange between parts of the system. The exchange of heat with the fluid inside the storage tank requires precise and accurate control to avoid mixing of the different temperature regions, which would render the storage unusable. The disclosure also mentions a heat exchanger embedded in the sorbent structure, which presents numerous disadvantages as outlined above.

SUMMARY

The systems and methods in accordance with the invention recover the optimum amount of heat in steam-assisted TVSA. Because the degree of heat recovery depends on the size of the additional equipment needed, the optimum amount of recovery requires a tradeoff between the savings in the cost of energy and the added cost for equipment. This invention provides an efficient way to heat the adsorbent bed and to subsequently recover a significant portion of the heat without use of embedded heat exchangers. Example embodiments of the invention provide advantages over previous systems and methods, including:

1. Heating the sorbent and surrounding structure by direct contact with steam, thereby producing a uniform temperature distribution with minimal temperature difference required for heat transfer.
2. Using direct contact heat exchange, the methods can transfer heat with less energy loss than methods that use embedded heat exchangers.
3. Recovering, with recuperative heat exchange, heat released by steam condensing and subcooling prior to $CO_2$ separation and water treatment when water is returned to the system.

The present invention relates to systems and methods of heat recovery in a carbon dioxide ($CO_2$) capture and separation system (CCSS). The methods include introducing steam generated by an evaporator into a reactor of the system and heating a sorbent material in the reactor using the steam. The steam leaves condensed water, steam vapor, and $CO_2$ within the reactor. When temperature and pressure within the reactor reach predetermined thresholds, an outlet valve downstream from the reactor is opened. The steam vapor and the $CO_2$ from the reactor are directed to a vapor re-compressor via the outlet valve. The mixture of steam vapor and $CO_2$ exiting the reactor is sometimes referred to herein as the product stream. The vapor re-compressor increases the temperature and pressure of the product stream and then directs the product steam having an increased temperature and pressure to a condenser where the directed steam vapor and $CO_2$ are cooled and condensed from the product stream in the condenser. Latent heat is recovered from the vapor with the condenser by directing a first portion of the vapor from the condenser to the evaporator.

The methods can further include directing the condensed water from the reactor to the evaporator via the same path in which the steam is introduced into the reactor.

The methods can further include directing the condensed water from the reactor to the evaporator via a separate path from which the steam is introduced into the reactor.

The methods can further include directing the condensed water from the reactor to a water treatment station and introducing the treated condensed water from the water treatment station into the reactor.

The methods can further include directing the condensed water from the reactor to a water treatment station and introducing the treated condensed water from the water treatment station into the evaporator.

The methods can further include condensing a second portion of the vapor to create liquid water and directing the liquid water and the $CO_2$ to a water treatment station.

The methods can further include separating, by the water treatment station, the $CO_2$ from the liquid water.

The methods can further include introducing the liquid water separated by the water treatment station into the reactor to cool the sorbent material. The liquid water can convert to evaporated water as the sorbent material cools.

The methods can further include directing the evaporated water from the reactor to the evaporator.

In an exemplary embodiment, the predetermined threshold can be 1.0 bar. In another exemplary embodiment, the steam can directly condense onto the sorbent material. In another exemplary embodiment, the steam can provide substantially uniform temperature distribution within the reactor. In another exemplary embodiment, the reactor may be evacuated and hermetically sealed before the steam is introduced into the reactor.

The methods can further include before introducing the steam to the reactor, evacuating the reactor to a pressure in the range of 0.05-0.3 bar.

In an exemplary embodiment, the system can include a plurality of reactors connected in parallel and the outlet valve can be a single valve downstream of the plurality of reactors.

The methods may further include continuously recycling the condensed water from the reactor and treating the condensed water in a water treatment station before reintroducing the condensed water into the reactor.

In an exemplary embodiment, the introducing of the steam generated by the evaporator into the reactor of the system can include removing air within the reactor as the steam is introduced into the reactor.

In an exemplary embodiment, the ratio of the air and the steam can change over time and the method can further include (when the air is removed from the reactor) restarting a steam purge to regenerate the sorbent material, or continuing to provide steam into the reactor while leaving the reactor open to permit the $CO_2$ to exit a bed.

In an alternative embodiment, the present invention relates to a carbon dioxide ($CO_2$) capture and separation system (CCSS). The system can include an evaporator configured to generate steam, a reactor including sorbent material, an outlet valve downstream from the reactor, a vapor re-compressor, and a condenser. The steam generated by the evaporator can be introduced into the reactor. The sorbent material can be heated using the steam and the steam leaves condensed water, steam vapor, and $CO_2$ within the reactor. The outlet value can be opened in response to temperature and pressure within the reactor reaching predetermined thresholds. The steam vapor and the $CO_2$ comprise a product stream that can be directed from the reactor to the vapor re-compressor via the outlet valve. The directed steam vapor and $CO_2$ from the vapor re-compressor can be cooled and condensed in the condenser. Latent heat from the vapor can be recovered with the condenser by directing a first portion of the vapor from the condenser to the evaporator.

The system may further include a water treatment station such that the condensed water is directed from the reactor to the water treatment station, and the treated condensed water is introduced to the reactor from the water treatment station.

The system may further include a plurality of reactors connected in parallel. In an exemplary embodiment, the outlet valve can be a single valve downstream of the plurality of reactors.

In another exemplary embodiment, the present invention may include an energy-efficient method of capturing carbon dioxide ($CO_2$) from the atmosphere. Atmospheric air comprising an ambient concentration of $CO_2$ can be circulated over, through, or around a sorbent contained within a sorbent container capable of being hermetically sealed. The sorbent container can be hermetically sealed using valves when adsorption is complete. Residual air from the sorbent container can be removed by evacuating the sorbent container to a pressure in the range of 0.05-0.3 bar using a vacuum pump. Steam from an evaporator can be admitted into the sorbent container to heat the sorbent to a desired temperature. Liquid condensate can be drained from the sorbent container and returned to the evaporator. The sorbent container can be purged with additional steam to desorb $CO_2$ from the sorbent and directing the resulting mixture of steam and $CO_2$ out of the sorbent container and into a vapor re-compressor. The vapor re-compressor can be used to increase the temperature and pressure of the mixture of steam and $CO_2$ and then direct the mixture to a condenser. The condenser can be used to recover latent heat from the mixture of steam and $CO_2$ and transfer the heat to convert cooling water in the condenser to steam which is returned to the evaporator. The mixture of steam and $CO_2$ can be further directed to exit the condenser to a treatment station where water vapor is cooled to near ambient temperature and condensed as liquid water and separated from gaseous $CO_2$. The steam purge can be stopped and the sorbent container can be hermetically sealed using valves when desorption is complete. A fine mist of cooled liquid water can be sprayed from the treatment station into the sorbent container and the sorbent container can be evacuated with a vacuum pump to evaporate the water and cool the sorbent and the sorbent container. The evaporated water can be returned to the evaporator, thereby recovering the sensible heat from the sorbent and the sorbent container. The sorbent container can be returned to atmospheric pressure after it has been cooled to a desired temperature to complete one cycle.

In another exemplary embodiment, the present invention may include an energy-efficient method of capturing carbon dioxide ($CO_2$) from the atmosphere. Atmospheric air comprising an ambient concentration of $CO_2$ can be circulated over, through, or around a sorbent contained within a sorbent container capable of being hermetically sealed. The sorbent container can be hermetically sealed using valves when adsorption is complete. Residual air from the sorbent container can be removed by evacuating the sorbent container to a pressure in the range of 0.05-0.3 bar using a vacuum pump. Steam from an evaporator can be admitted into the sorbent container to heat the sorbent to a desired temperature. Liquid condensate can be drained from the sorbent container and returning the liquid condensate to the evaporator. The sorbent container can be purged with additional steam to desorb $CO_2$ from the sorbent and directing the resulting mixture of steam and $CO_2$ out of the sorbent container and into a vapor re-compressor. The vapor re-compressor can be used to increase the temperature and pressure of the mixture of steam and $CO_2$ and then direct the mixture to a condenser. The condenser can be used to recover latent heat from the mixture of steam and $CO_2$ and transfer the heat to convert cooling water in the condenser to steam which is returned to the evaporator. The mixture of steam and $CO_2$ can be further directed to exit the condenser to a treatment station where water vapor is cooled to near ambient temperature and condensed as liquid water and separated from gaseous $CO_2$. The steam purge can be stopped and the sorbent container can be hermetically sealed using valves when desorption is complete. A fine mist of cooled liquid water can be sprayed from the treatment station into the sorbent container and the sorbent container can be evacuated with a vacuum pump to evaporate the water and cool the sorbent and the sorbent container. The evaporated water can be returned to the evaporator, thereby recovering the sensible heat from the sorbent and the sorbent container. The sorbent container can be returned to atmospheric pressure after it has been cooled to a desired temperature to complete one cycle.

BRIEF DESCRIPTION OF THE DRAWINGS

These and other objects, features, and advantages of the invention will be more fully appreciated or become better understood when considered in conjunction with the accompanying drawings, where.

DETAILED DESCRIPTION

Figure 1:
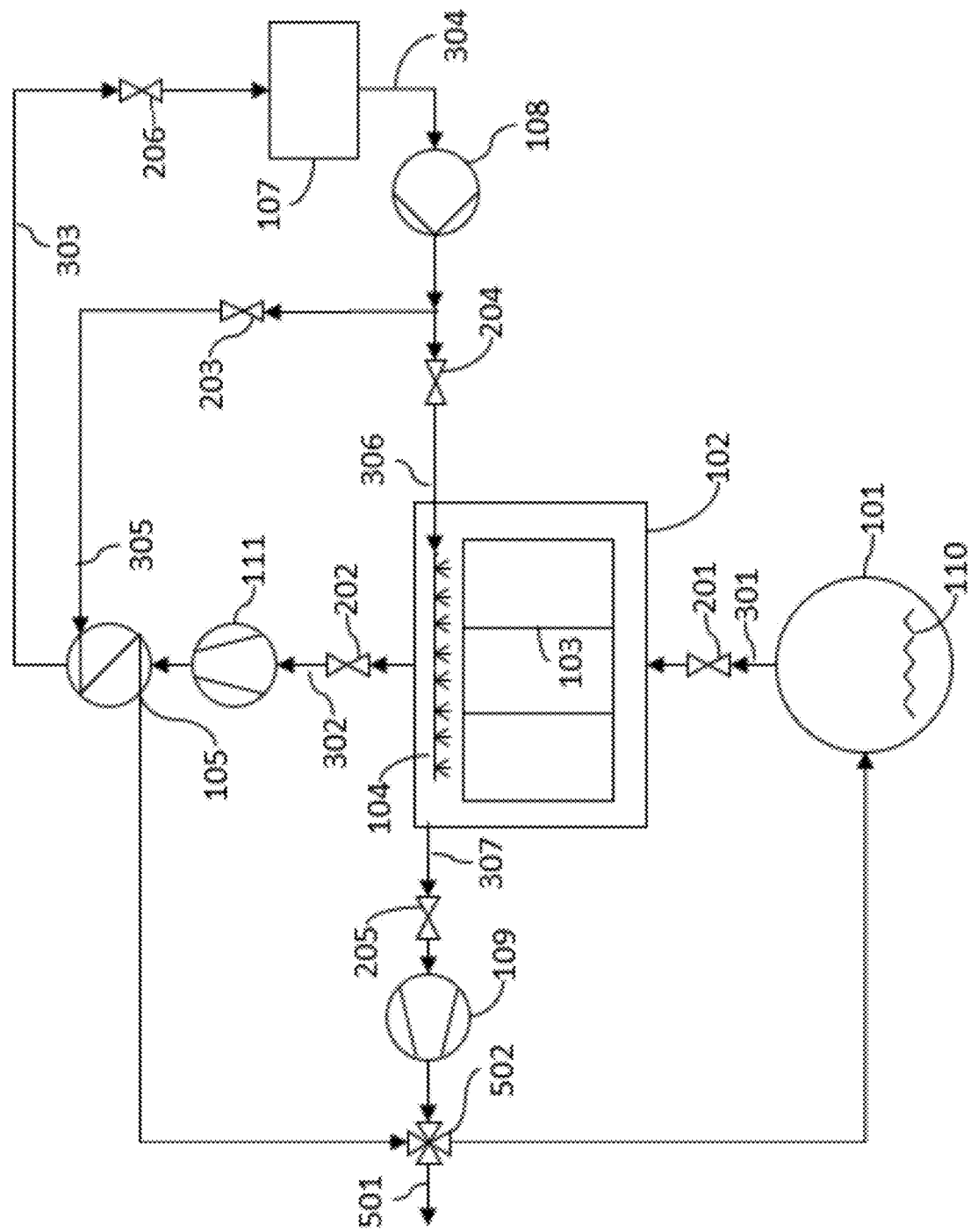
FIG. 1 shows an exemplary system in accordance with the invention.

The various embodiments are described in detail with reference to the accompanying drawings. Whenever possible, the same reference numbers are used throughout the drawings to refer to the same or like parts. References made to particular examples, details, and representative materials, methods, and implementations are for illustrative purposes only, and thus do not, and are not intended to, limit the scope of the various embodiments of the claims.

In one example embodiment in accordance with the invention, a system includes several process variations from the general steam-assisted TVSA process described above. Adsorption and evacuation can use typical methods. The methods for heating the sorbent, however, are to introduce steam directly into the sorbent container ("reactor") at a controlled rate and specified temperature and pressure. The term process steam is sometimes used herein to refer to such steam that enters the sorbent container at a controlled rate, temperature, and pressure. The terms sorbent container and reactor are used interchangeably herein to refer to a process vessel containing a sorbent and within which the adsorption and desorption processes take place. The sorbent container is capable of being hermetically sealed using valves. This steam is allowed to adsorb and condense directly onto the sorbent material; the heat of condensation and heat of adsorption raise the temperature of the sorbent. As the steam is introduced into the reactor, the pressure in the reactor increases. Once the temperature and pressure in the sorbent reaches a specified value (typically around 100° C. and just over 1.0 bar pressure, although other temperatures and pressures may be applicable depending upon the desorption characteristics of the particular sorbent material utilized), a downstream valve is opened, and the steam purge step can begin as described earlier.

Compared to other systems that may utilize internal surface heat exchangers embedded in the sorbent, allowing the steam to condense on the sorbent provides much faster, more even, and more efficient heating in a more compact and simpler overall sorbent container designs. Condensed water is drained using equipment built into the sorbent container and integrated into the rest of the systems. Some sorbents cannot be exposed to liquid water during operation due to leaching or degradation of the sorbent; however, the systems in accordance with the invention utilize a sorbent that withstands this process. Nonlimiting examples of such sorbents include solid-phase anion exchange resins, cross-linked polyamine materials, and the like.

Following steam heating, steam regeneration continues as described in the general process. The steam purge enhances desorption by lowering the partial pressure of $CO_2$ in the space surrounding the sorbent and by providing a motive force to remove this $CO_2$ from the sorbent container. Downstream of the sorbent container, product $CO_2$ is separated from the steam by using a condenser to cool the outgoing stream, which causes most of the water to condense out from the outgoing gas stream. In general, process steam enters the sorbent container with a pressure around atmospheric pressure which is suitable for heating and purging of the sorbent. In one example embodiment, the steam purge enters the sorbent container at just over 1.0 bar—just enough to overcome the pressure drop from steam injection to collection at ambient pressure. However, in other example embodiments, a higher or lower purge pressure may be desired. A lower pressure can be achieved using a vacuum pump to pull the steam through the reactor at a specified sub-ambient pressure. In some embodiments of the present invention, the process steam enters the sorbent container at a pressure between about 0.8-1.3 bar, 0.8-1.2 bar, 0.9-1.1 bar, 1.0-1.1 bar, 1.0-1.2 bar, 1.0-1.3 bar, 1.1-1.2 bar, 1.1-1.3 bar, or 1.2-1.3 bar. In some embodiments of the present invention, the process steam enters the sorbent container at a pressure between about 1.0-1.1 bar. In some embodiments of the present invention, the process steam enters the sorbent container at a pressure of about 1.1 bar.

The systems and methods in accordance with the invention provide process advantages by creating more process flexibility in the regeneration step. A typical process using internal surface heaters must avoid condensation of the steam to 1) protect the sorbent and 2) avoid flooding a container that is not designed to drain liquids. This presents a challenge as the incoming steam must be significantly superheated in order to provide the heat of desorption for $CO_2$ without condensing within the sorbent container. The systems and methods of the invention do not have this requirement. There is no issue with providing desorption heat via condensation and a simpler saturated steam system can be used. As in heating, the water that is condensed in this step can be drained and collected for re-use. Although this condensed water will need to be reboiled to create new process steam, its temperature is still considerably higher than fresh makeup water, thereby retaining heat energy within the system.

Once regeneration is complete, the sorbent is cooled to near ambient temperature. Some sorbents are cooled by flowing in airflow using the same fan that is used during adsorption; however, some sorbents (including most amines) will degrade if exposed to atmospheric concentrations of oxygen at elevated temperatures. Another common method is to cool with cold fluid using embedded heat exchangers in the sorbent container. In the systems and methods in accordance with the invention, however, the direct contact of sorbent with water allows for cooling via evaporation. As with heating, this cooling method is fast and uniform and requires no embedded heat exchanger.

In evaporative cooling, the reactor pressure is lowered using a vacuum pump. This lowering of pressure causes water that is sitting on or adsorbed into the sorbent to evaporate. The evaporation of this water removes heat from the sorbent. Downstream of the sorbent container, the vapor is condensed to recover the water and to separate out remaining $CO_2$ in the stream. In the case that there is not enough residual water to evaporate off the sorbent to provide adequate cooling, a liquid cooling spray can be injected into the reactor to supplement the process. Once the sorbent has reached a temperature that is safe and effective for airflow exposure, the reactor can be repressurized with air and a new adsorption can begin. In a typical process, the sorbent is cooled to about 40-50° C. before repressurization. In other embodiments, the sorbent is cooled to about 50-60, 60-80, or 70-80° C. before repressurization In general steam-assisted TVSA processes, significant amounts of heat are required to generate the steam that is introduced into the reactor. The energy used to create this steam is consumed via several thermal sinks, including:

Losses to ambient, due to imperfect insulation between the reactor space and the outside walls;

Desorption heat, to release $CO_2$ molecules that have been adsorbed into the sorbent;

Sensible heat, required to raise the temperature of the sorbent, the inert substrate and/or binder, and surrounding reactor internal structure to the desorption temperature; and Purge heat, which is the energy required to generate the steam that sweeps out the $CO_2$ but does not otherwise contribute heat to the desorption process.

As dictated by a system energy balance, all the heat inputted to the reactor must exit the reactor via some process. In theory, this heat can be recovered and used elsewhere in the process. Desorption heat and losses to ambient are difficult to recover. However, because of the direct steam injection and evaporative cooling methods used in the systems and methods of the invention, all of the purge heat energy and a significant amount of the sensible heat energy leaves the reactor in the form of water vapor mixed with some amount of $CO_2$. The systems and methods of the invention provide efficient methods to accomplish this recovery by using the heat of condensation and sensible heat of the outgoing water vapor to create new, fresh steam which can be re-introduced into the reactor (or into a different reactor operating in parallel).

To achieve this recovery, a mechanical vapor recompression process is used where the temperature of the outgoing water vapor is lifted to 105-115° C. using a compressor. This provides the temperature differential required to effectively pass heat to an incoming water stream and boil new steam at close to 100° C. Work in the form of electrical energy into a motor is required to lift the temperature of the outgoing steam and $CO_2$ mixture to enable this recovery. However, the required electrical energy is estimated to be 10 to 20 times less than the amount of thermal energy that is recovered using this method.

One embodiment of the system is illustrated in FIG. 1. An evaporator 101 containing saturated water vapor and liquid water supplies steam along path 301 to a sorbent 103 inside a container 102 by way of the motive vapor pressure inside evaporator 101. From sorbent container 102, vapor and $CO_2$ flow through a condenser 105 before entering a treatment station 107 along path 303 by way of the motive force of a vapor re-compressor 111. Downstream of treatment station 107, a pump 108 supplies liquid water to condenser 105 along a path 305. Pump 108 can also supply liquid water to a sorbent spray manifold 104 inside sorbent container 102 along path 306. Water vapor inside sorbent container 102 can be returned to evaporator 101 along a path 307 through a multi-way valve 502 by way of the motive force of a mechanical vacuum pump 109. Air inside sorbent container 102 can be exhausted to atmosphere along path 501 through multi-way valve 502, also by way of the motive force of vacuum pump 109.

The process for capturing $CO_2$ according to the example embodiment is presented in the context of the five basic steps previously described: 1) adsorbing, 2) evacuating, 3) heating, 4) regenerating, and 5) cooling.

Figure 2:
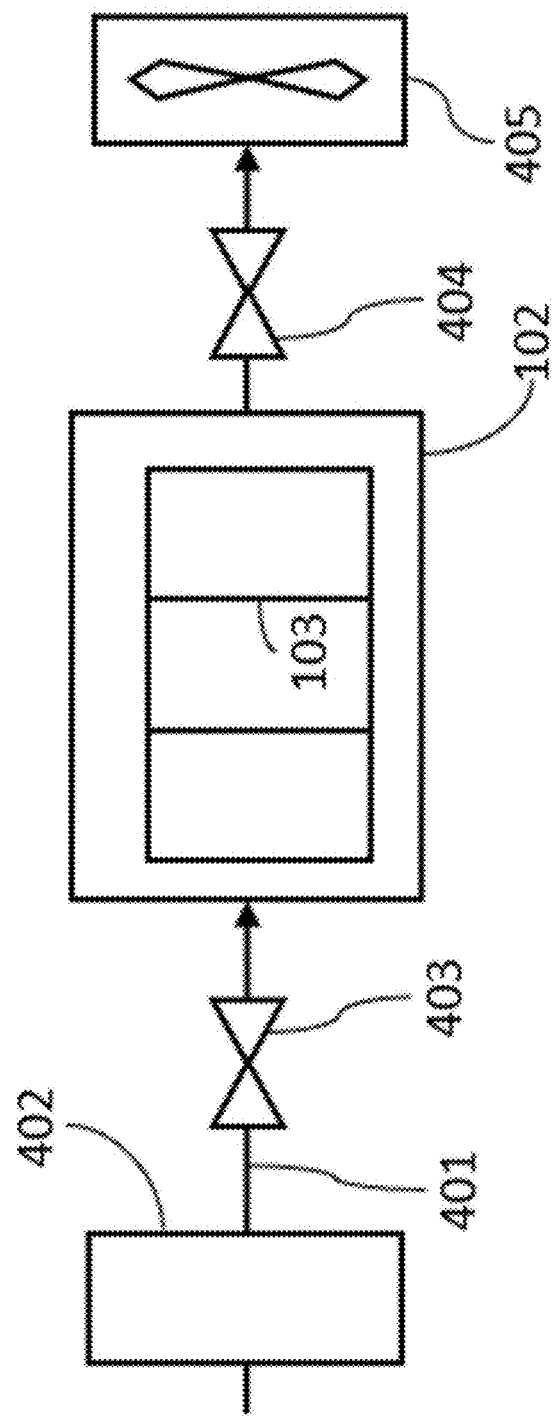
FIG. 2 shows exemplary process steps for adsorbing $CO_2$ in a system in accordance with the invention.

FIG. 2 shows exemplary relevant aspects related to step 1, adsorbing. During the adsorbing step, atmospheric air containing an ambient concentration of $CO_2$ is drawn into sorbent container 102 along a path 401, passing through an air filter 402, an air inlet valve 403, over sorbent 103, and through an air outlet valve 404 by way of the motive force of fan 405. At the end of step 1, fan 405 is shut off, and inlet valve 403 and outlet valve 404 are closed, thereby hermetically sealing the sorbent container 102. In some embodiments of the present invention, air filter 402 is located on the air inlet side of sorbent container 102 and the fan 405 is located on the air outlet side and pulls the air through sorbent container 102. In some embodiments of the present invention, a fan or blower may instead be located on the air inlet side in front of air filter 402 and push air through the air filter 402 and the sorbent container 102.

Figure 3:
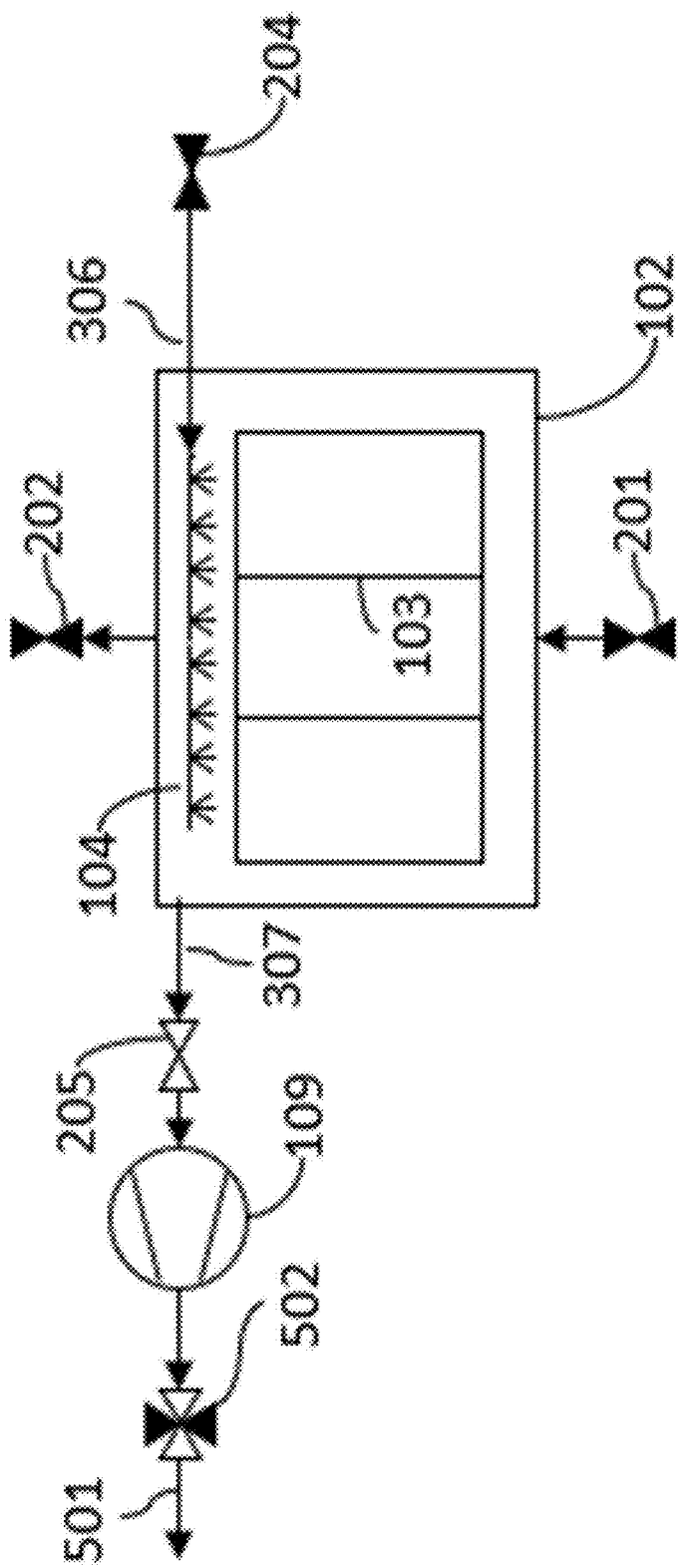
FIG. 3 shows exemplary process steps for evacuating the sorbent container in a system in accordance with the invention.

FIG. 3 shows exemplary relevant aspects related to step 2, evacuating. During the evacuating step, residual air in the hermetically sealed sorbent container 102 is exhausted to the atmosphere along a sorbent evacuation path 307 and vacuum exhaust path 501 through a sorbent evacuation valve 205 and multi-way valve 502 by way of the motive force of vacuum pump 109. During evacuation, a sorbent steam/$CO_2$ outlet valve 202, a sorbent cooling water valve 204, and a sorbent steam inlet valve 201 are closed. The evacuating step is complete when the pressure in sorbent container 102 is reduced to a specified pressure, typically 0.05-0.3 bar. At the end of step 2, sorbent evacuation valve 205 is closed, and compressor 109 is shut off.

Figure 4:
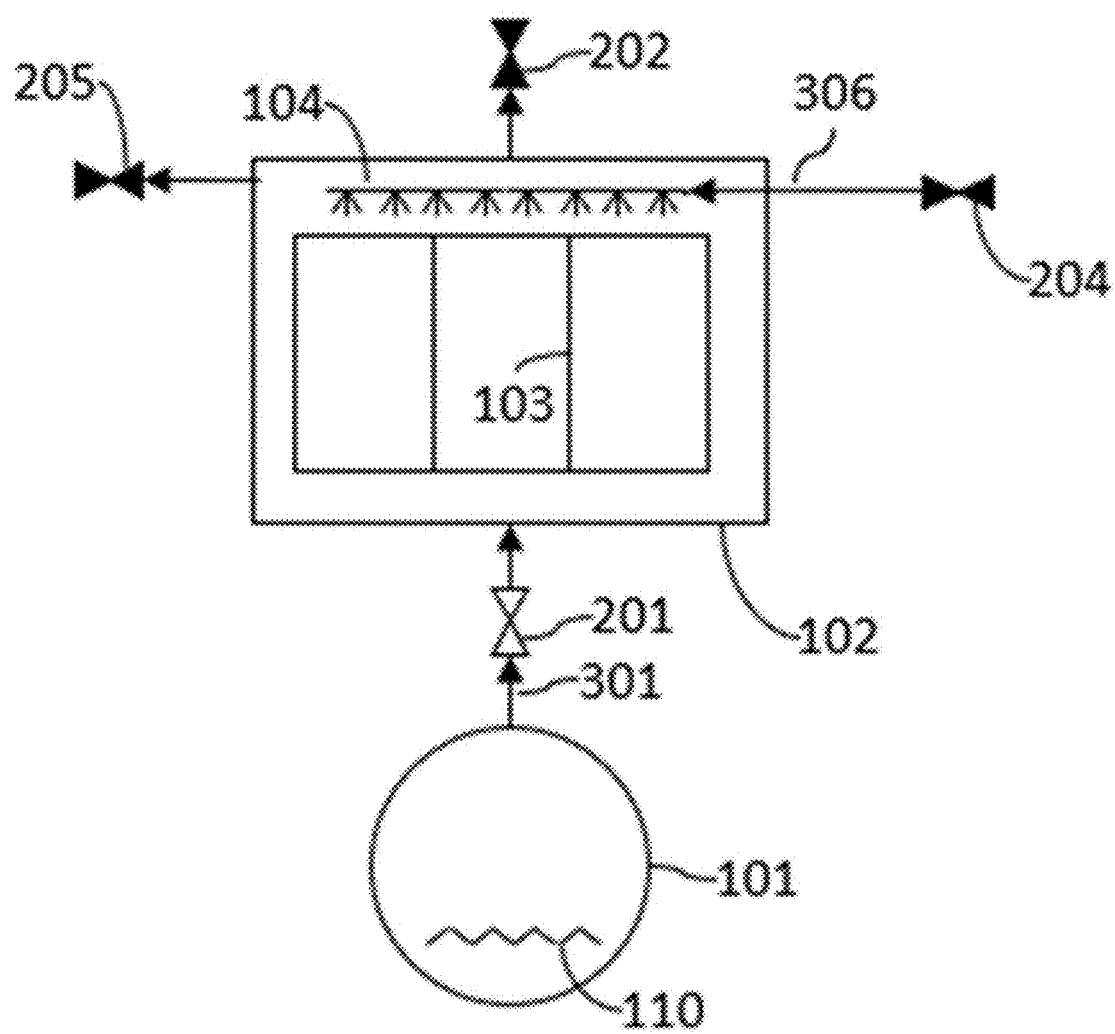
FIG. 4 shows exemplary process steps for heating the sorbent in a system in accordance with the invention.

FIG. 4 shows exemplary relevant aspects related to step 3, heating the sorbent. Steam from evaporator 101 is admitted into sorbent container 102 along a path 301 through sorbent steam inlet valve 201 by way of the motive pressure in evaporator 101. The rate of steam admission can be regulated by controlling sorbent steam inlet valve 201. The steam pressure in evaporator 101 can be maintained by controlling the input power to an immersed heating element 110. The condensing of steam inside sorbent container 102 uniformly heats sorbent 103 to a final desired temperature. Liquid condensate drains back to evaporator 101 along path 301 by way of gravity.

Figure 5:
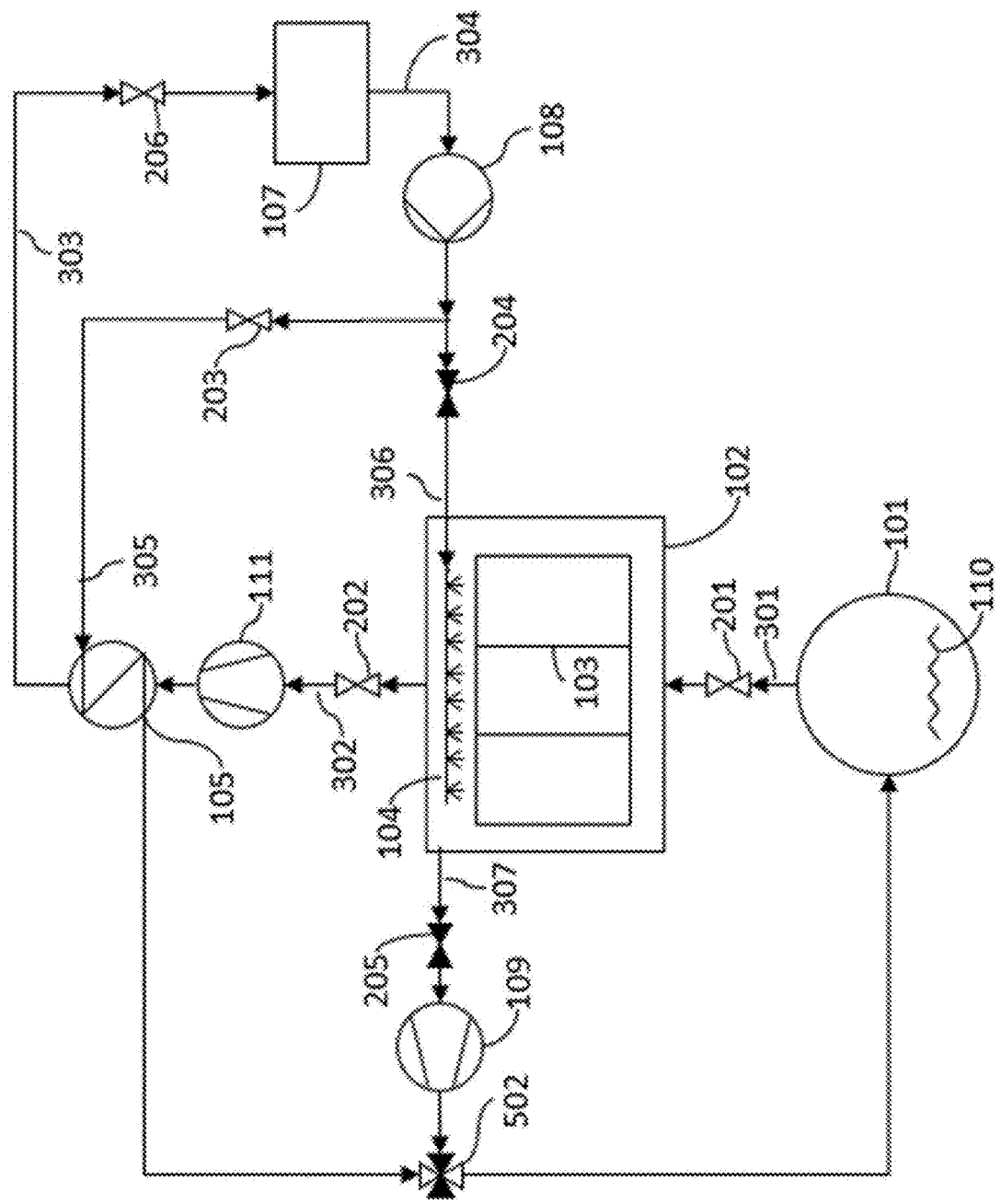
FIG. 5 shows exemplary process steps for regenerating the sorbent using a steam purge and recovering heat via recuperative heat exchange in a system in accordance with the invention.

FIG. 5 shows exemplary relevant aspects related to step 4, regenerating the sorbent. Steam is admitted to sorbent container 102 through sorbent steam inlet valve 201. The motive pressure in evaporator 101 can be maintained by controlling the input power to the immersed electrical heating element 110. A mixture of steam and $CO_2$ flows out of sorbent container 102 and into vapor re-compressor 111 along path 302. The mixture of steam and $CO_2$ flows through condenser 105 by way of the motive force of vapor re-compressor 111. The vapor re-compressor 111 increases the temperature of the steam and $CO_2$ from the sorbent container 102 allowing more effective heat transfer to the fluid once it reaches the condenser 105. Cooling water enters the cold side of the condenser along path 305 by way of the motive force of pump 108. The rate of cooling water flow, and hence the condensation of vapor by direct contact with the cooling water, is regulated by controlling condenser cooling water valve 203. The condenser serves to recover the latent heat contained in the steam and re-introduce that energy as steam into evaporator 101 through multi-way valve 502. The mixture of water and $CO_2$ from condenser 105 flows into treatment station 107, where water vapor is condensed, and gaseous $CO_2$ is separated from the liquid water by way of gravity.

Figure 6:
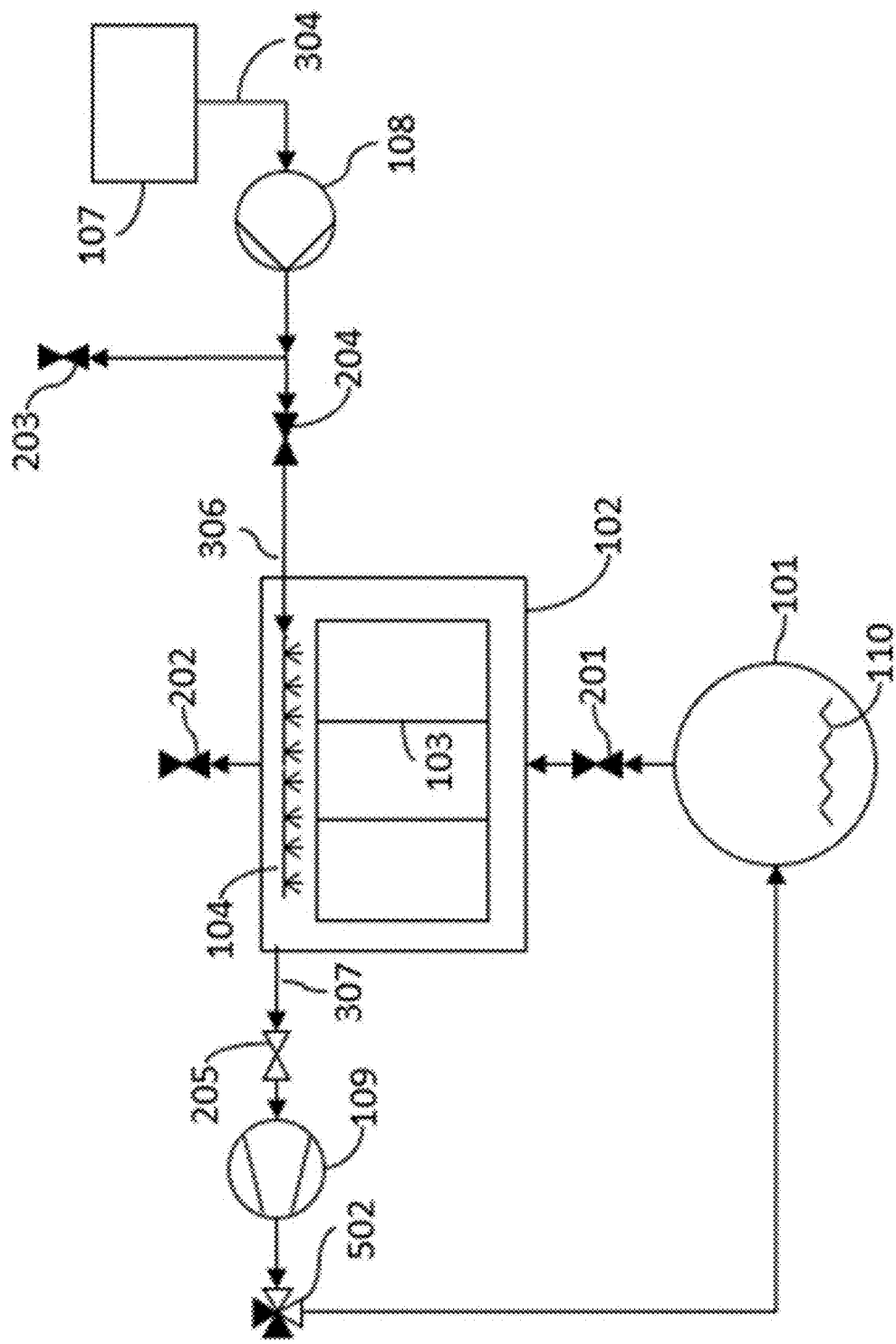
FIG. 6 shows exemplary process steps for cooling the sorbent and recovering sensible heat in a system in accordance with the invention.

FIG. 6 shows exemplary relevant aspects related to step 5, cooling the sorbent. By way of the motive force of pump 108, liquid water from treatment station 107 at a temperature close to ambient enters sorbent container 102 through sorbent spray manifold 104 along path 306. The flow rate of cooling water, and hence the rate of cooling, can be regulated by controlling a sorbent cooling water valve 204. Cooling water manifold 104 distributes the water uniformly inside the sorbent container 102 as a fine mist. The evaporation of this water removes heat from sorbent 103 and sorbent container 102. The evaporated water is removed from sorbent container 102 through sorbent evacuation valve 205 along path 307 by way of the motive force of vacuum pump 109, from where the water enters evaporator 101 through multi-way valve 502, thereby recovering the sensible heat to the steam source.

Figure 7:
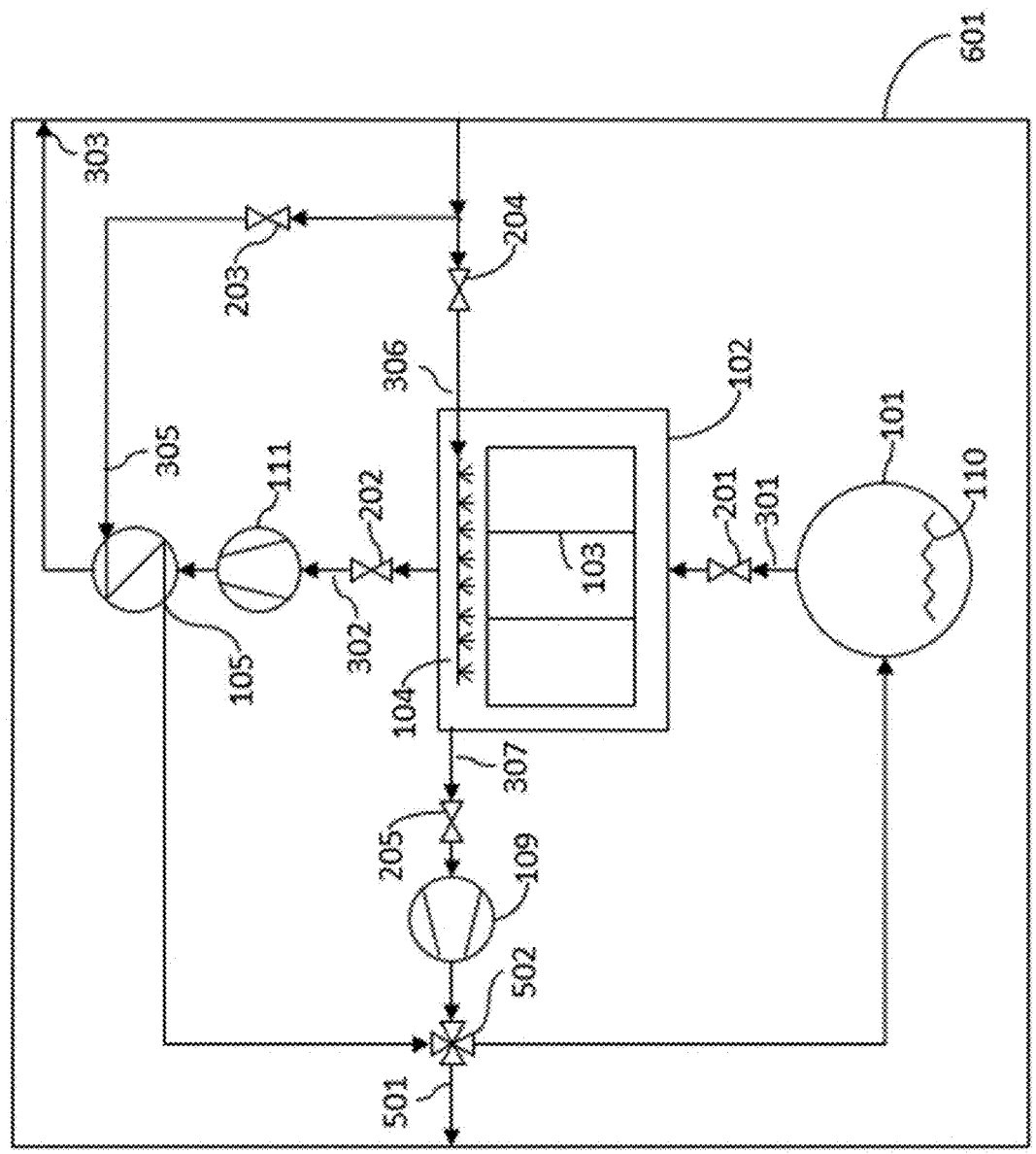
FIG. 7 shows exemplary $CO_2$ capture process modules in accordance with the invention that can be operated in parallel and share common supply, treatment, and process lines.
Figure 8:
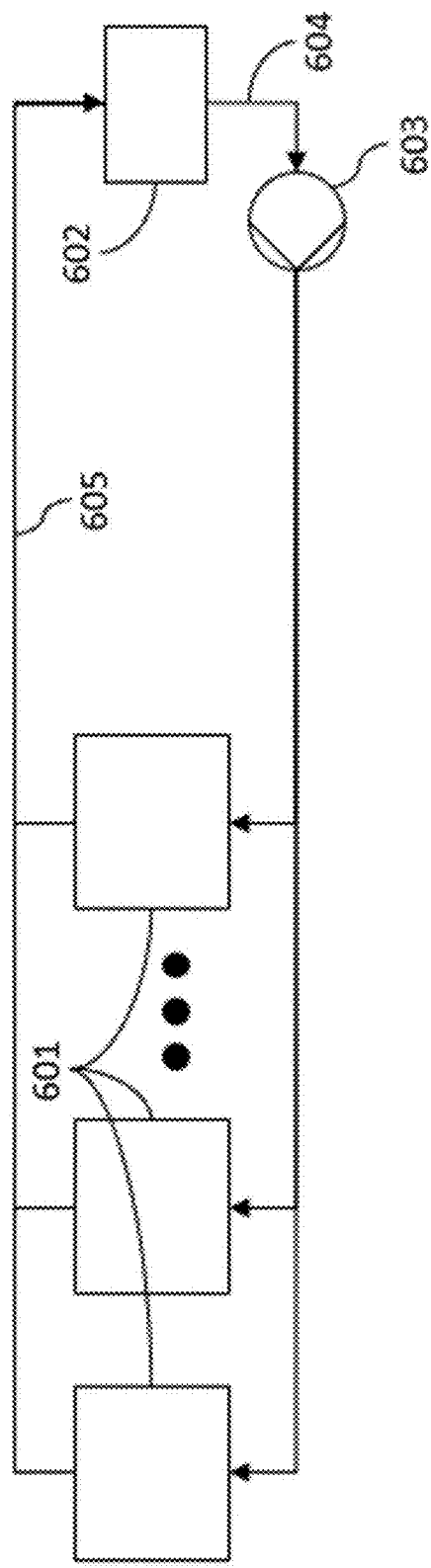
FIG. 8 shows an example of $CO_2$ capture process modules sharing common supply, treatment, and process lines.

In another embodiment, additional single $CO_2$ capture modules 601, as shown in FIG. 7, may be connected to a common $CO_2$ return manifold 605 and common water supply manifold 604, which are in turn connected to a common water treatment station 602, as shown in FIG. 8.

Figure 9:
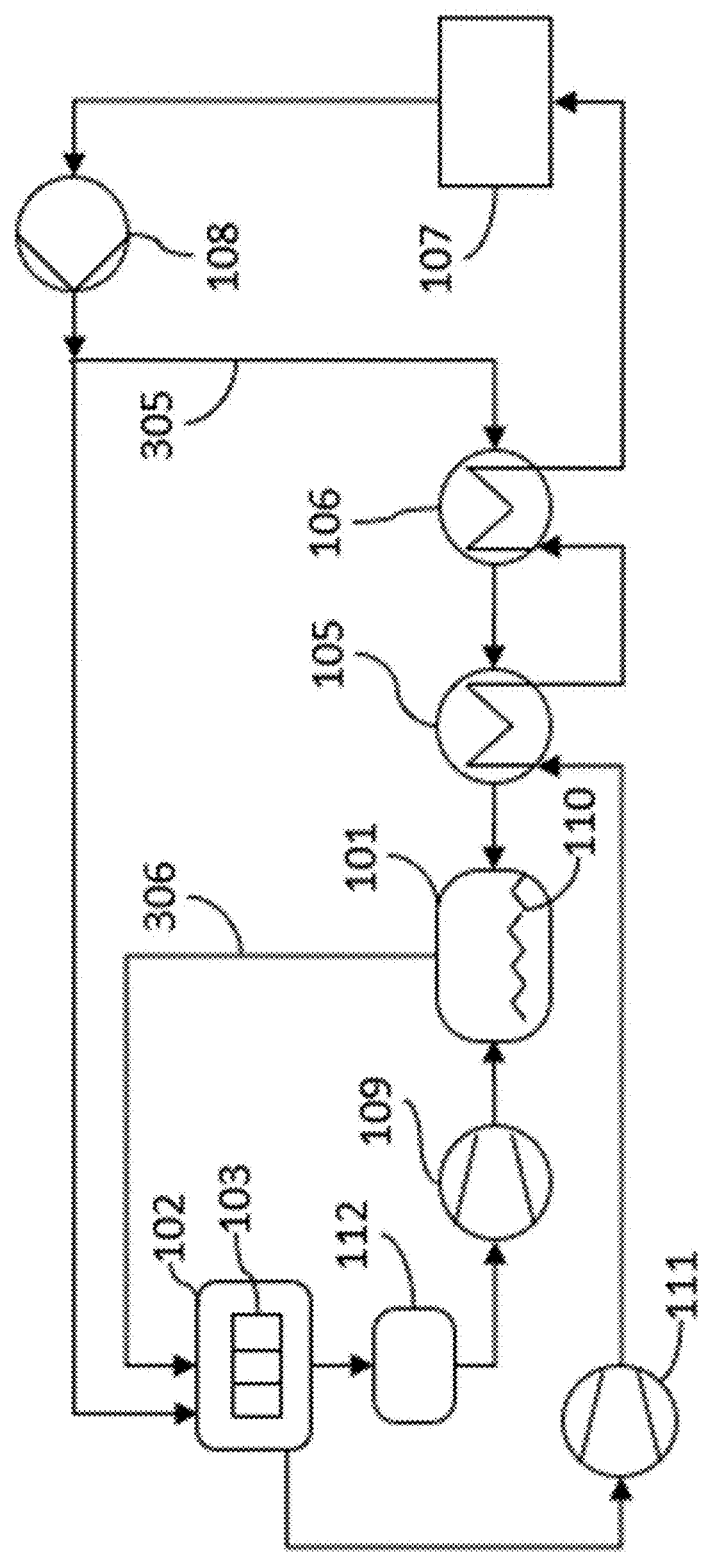
FIG. 9 shows an exemplary system in accordance with the invention with multiple types of heat recovery process equipment.

FIG. 9 shows an exemplary embodiment, where steam from evaporator 101 enters the sorbent container 102. The steam may enter from or be directed to the top of sorbent container 102 and flow down through the sorbent 103 in cases where vertical flow through the sorbent 103 is possible. Alternatively, the steam may enter from or be directed to a front side (e.g., air inlet side) or back side (e.g., air outlet side) of sorbent container 102 and flow through sorbent 103 in a horizontal direction. A condensate accumulator 112 is added to allow liquid to accumulate before being returned to evaporator 101 via the motive force of vacuum pump 109. Steam condenser 105 is split into separate heat exchangers, condenser 105 which recovers the latent heat of outgoing water vapor and a sub-cooler 106 which recovers the sensible heat of the condensate. $CO_2$ is separated and removed from the gas stream via condenser 105.

Figure 10:
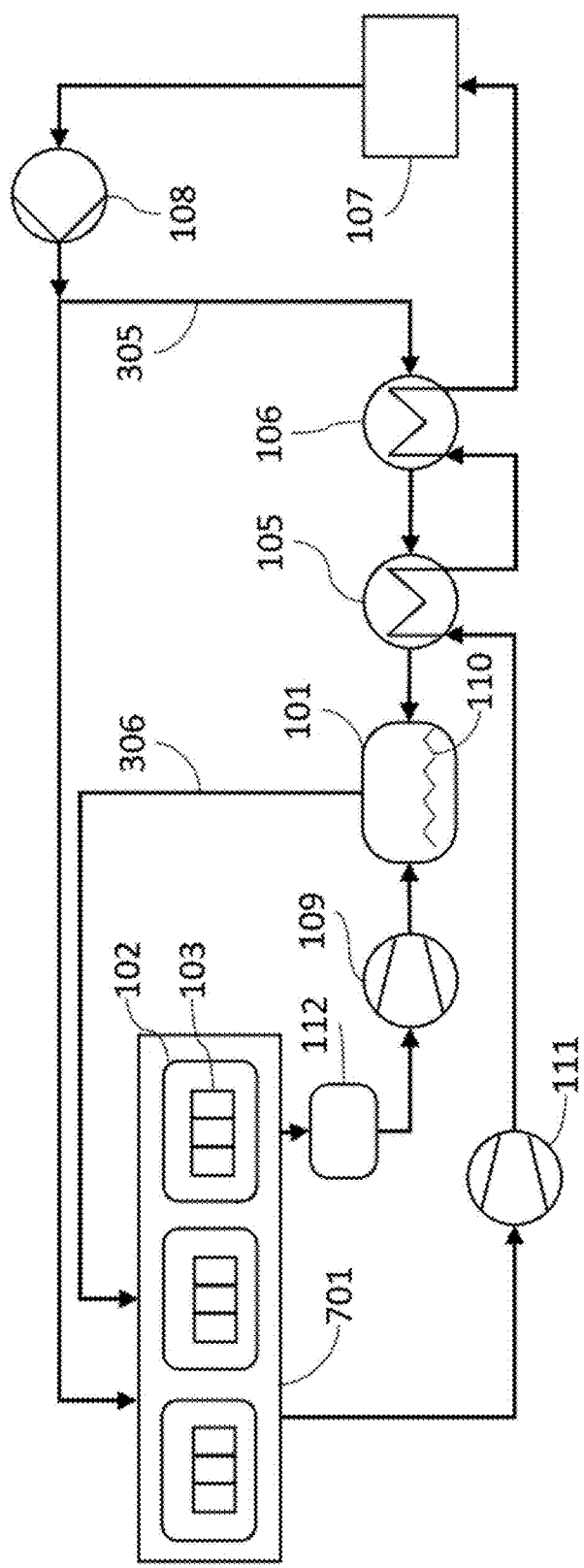
FIG. 10 shows an exemplary system in accordance with the invention where the heat recovery process equipment serves multiple sorbent containers in parallel.

FIG. 10 illustrates an exemplary embodiment in which additional sorbent containers 102, each containing sorbent 103, can utilize the equipment presented in FIG. 9 in parallel. These sorbent containers can be contained in a single larger module container 701. The process flows into and out of these sorbent containers is controlled using valves on inlet and outlet manifolds for each container. One advantage of this embodiment is that, by operating with multiple sorbent containers or modules in parallel, the process equipment such as compressor 111 can run in a mode that approaches steady-state operation.

Figure 11:
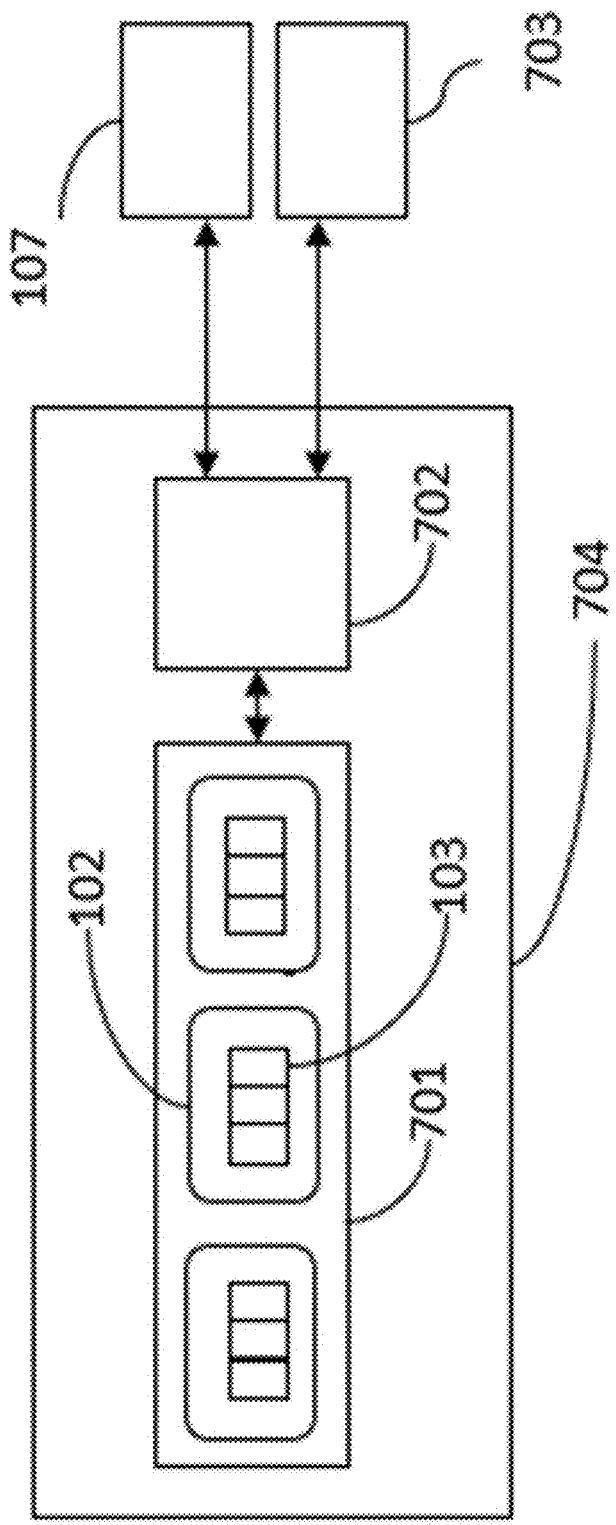
FIG. 11 shows an exemplary modular $CO_2$ capture and heat recovery system in accordance with the invention where multiple sorbent containers are arranged in a module, which is combined with a process equipment module to form a cluster and which may be combined with other clusters that share common plant services.

As shown in FIG. 11, the module container 701 can be further arranged by coupling it with utilities container 702, which contains the process equipment for the proposed system such as the equipment shown in FIG. 9. Together, this unit forms cluster 704. Multiple clusters can be built to form a modular plant architecture. These clusters may each share common plant services such as water treatment station 107 or other units such as $CO_2$ injection sites or on-site energy generation, generally represented by 703.

Figure 12:
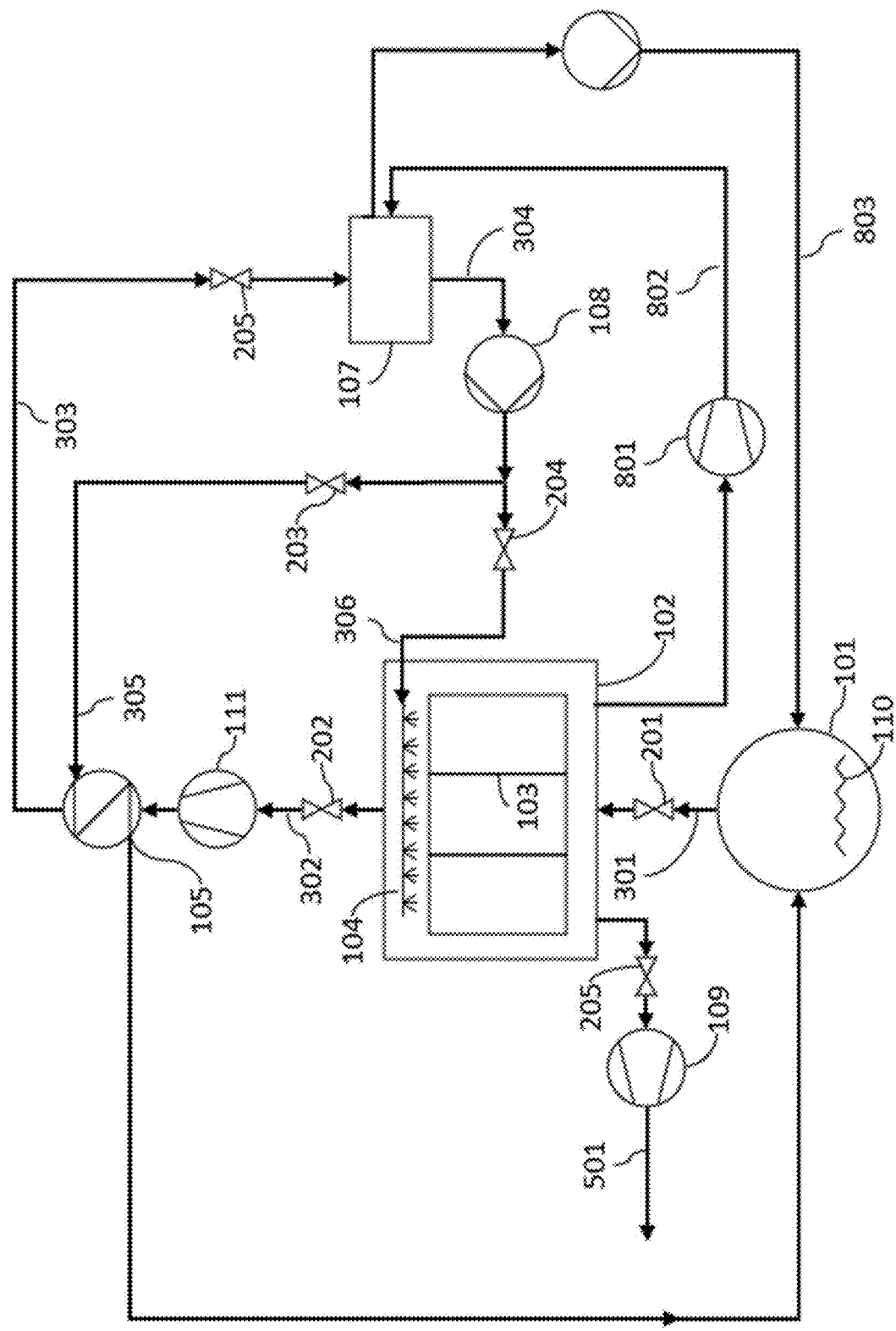
FIG. 12 shows an exemplary system in accordance with the invention where drained condensate is returned to water treatment prior to reuse.

FIG. 12 shows an exemplary embodiment where liquid that is drained from sorbent container 102 returns to water treatment station 107 via pump 801 through line 802. Compared to the initial embodiment, this ensures that all water passing over sorbent 103 is treated before it is re-introduced to that or any other sorbent container. Heat exchangers can be used between outgoing condensate line 802 and incoming evaporator feedwater line 803 to recover the sensible heat contained in this relatively warm drainage liquid.

In other exemplary embodiments, alternative methods can be used to provide some or all of the reactor sensible heat requirement, using electric heaters or an embedded heat exchanger, for example, with superheated steam subsequently introduced to sweep out desorbed $CO_2$. The energy recovery process described above can help recover the energy of this superheated steam purge. Other methods can be used to recover energy during the preheating and pre-cooling step.

Alternatively, the process can occur without a significant purge step, involving only a heating period followed by an immediate evaporation period. In this embodiment, the evaporative period both removes desorbed $CO_2$ and cools the sorbent. The sensible heat can be recovered using the methods described above; no purge heat recovery is necessary as there is no purge steam and therefore no purge heat to recover.

In other exemplary embodiments, the evaporator heating element 110 in FIG. 1 can be replaced with or used alongside of an external source of heat via a heat exchanger or direct injection of steam from an external supply. This external supply may include waste heat from another process internal to the DAC system or from an external partner.

In other exemplary embodiments, the processes can be modified to work at a range of desorption conditions, including temperature, pressure, time, and transients thereof. One example reduces or eliminates the purge step and removes the desorbed $CO_2$ alongside $H_2O$ during the evaporative cooling step. Another example embodiment uses a steam purge but uses a vacuum system to maintain the reactor pressure at a point between 0.2 and 1.0 bar. A third example embodiment injects steam into the sorbent container at a higher pressure than 1.0 bar, which uses a corresponding compression from the outgoing stream to generate this higher-pressure steam using recovered energy.

Figure 13:
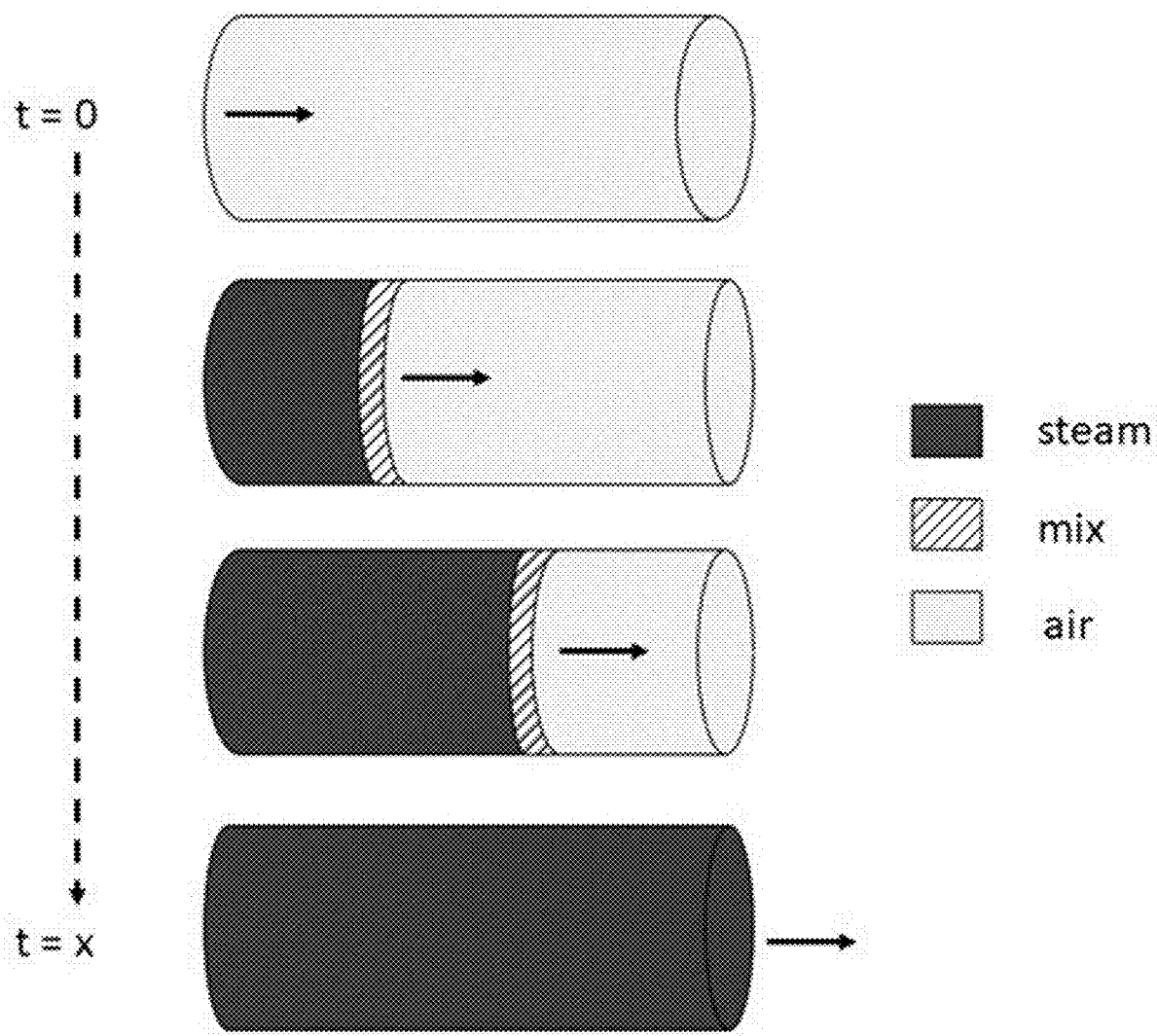
FIG. 13 shows an exemplary system in accordance with the invention where the evacuation step is replaced with a plug flow of steam to remove air from the sorbent container.

In an exemplary embodiment, the evacuation step is reduced or eliminated and replaced with a method that uses a plug flow of steam to displace the dead air and remove it from the sorbent container. This method is shown in FIG. 13. At time t=0, marking the start of the heating step, steam enters the reactor and pushes out air. After time t=x, the dead air is removed and desorption continues, either by sealing the sorbent container to permit heating and pressurization and then restarting a steam purge to regenerate the sorbent or by continuing the steam flow while leaving the sorbent container open to permit $CO_2$ to exit the bed as if performing a purge step.

In some example embodiments, the invention is not limited to using steam and uses other refrigerants at pressures that are ideal for the process equipment and fluid network. These alternative refrigerants condense onto the sorbent to provide heat and/or be condensed from the $CO_2$ after sweeping through the reactor. The benefits of using different refrigerants other than steam include enabling customization of the temperature and pressure of condensation.

In some embodiments of the present invention, high-pressure steam (sometimes referred to herein as plant steam) may be available from a centralized source, such as a shared plant services unit 703, and that can service multiple modular sorbent containers 102, module containers 701, or clusters 704. The high-pressure plant steam can be circulated throughout a large-scale modular plant architecture. The plant steam pressure can be reduced to the desired process steam pressure at or near each point of use. In some embodiments of the present invention, the plant steam will have a pressure of about 2-10 bar, 3-8 bar, or 4-6 bar. In some embodiments of the present invention, the plant steam will have a pressure higher than about 4 bar.

Figure 14:
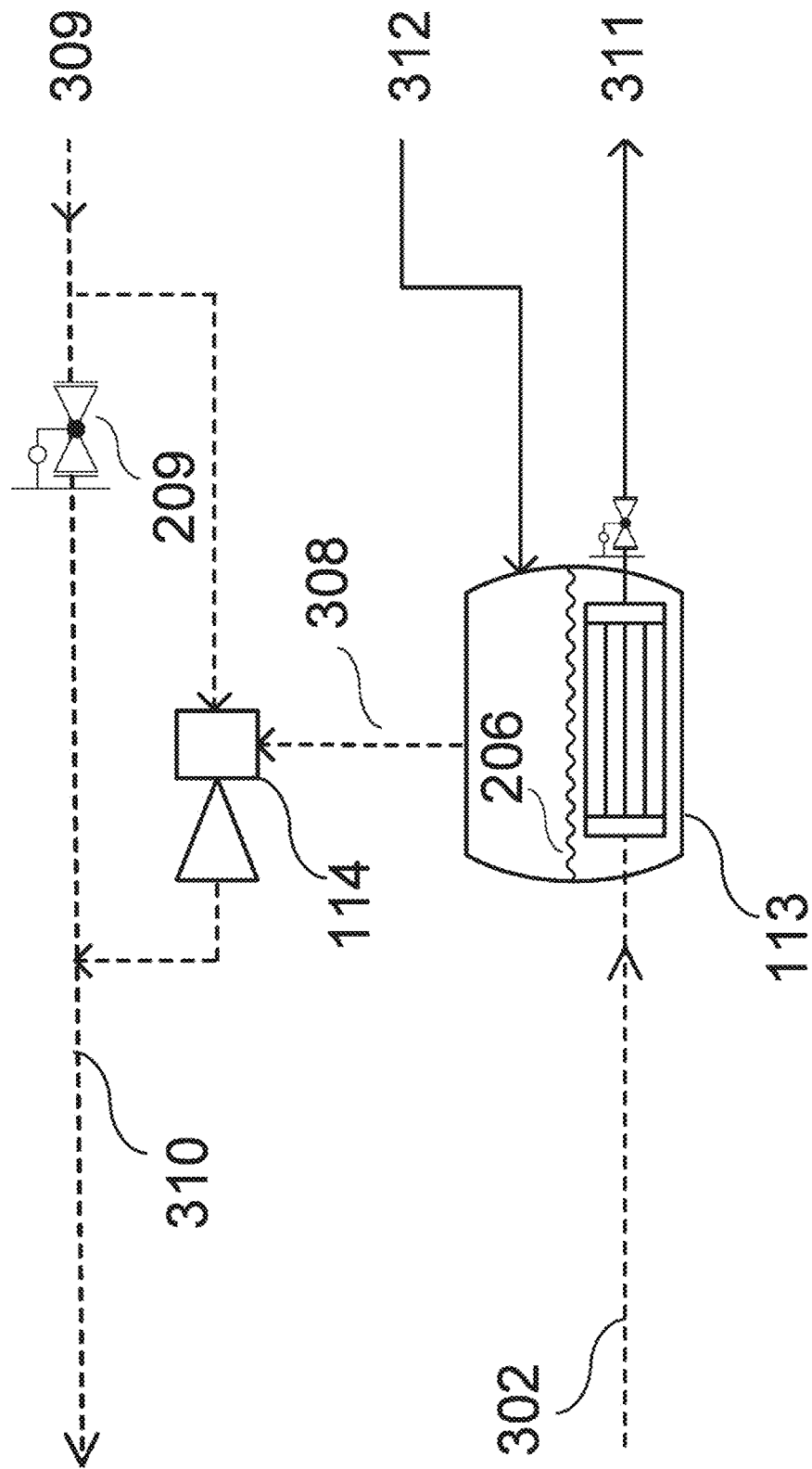
FIG. 14 shows an exemplary system in accordance with the invention where a jet ejector is utilized to recover heat.

A jet ejector can be used as an alternative to a mechanical vapor compressor in some embodiments of the present invention. FIG. 14 shows an exemplary embodiment where a jet ejector is used as an alternative to a mechanical vapor compressor (i.e., vapor re-compressor(s) described above) when, for example, a source of high-pressure plant steam 309 is available. The product stream of steam and $CO_2$ can flow out of one or more sorbent containers (not shown) along path 302 into re-boiler 113, generating low-pressure steam (less than 1 bar and generally about 0.4-0.6 bar) from the water 206 present in the re-boiler. In an alternative embodiment, steam and $CO_2$ can be introduced to re-boiler 113 from one or more sorbent containers 102. The low-pressure steam exits re-boiler 113 through pathway 308 to jet ejector 114. Pressure-sensing valve 209 diverts the flow of high-pressure plant steam through the jet ejector 114, creating motive force to pull the lower pressure steam through the jet ejector 114 and into process steam pathway 310. If the output from the jet ejector 114 is insufficient to provide the desired process steam pressure, the pressure-sensing valve 209 may allow some of the higher pressure plant steam 309 directly into the process steam pathway 310 to make up the difference in pressure. The cooled mixture of condensed steam and $CO_2$ exits re-boiler 113 for further separation and processing through pathway 311. Makeup water is provided to the re-boiler 113 through pathway 312. Since the high-pressure plant steam 309 must be let-down to lower pressure process steam anyway, there is optimization in the system by utilizing the jet ejector 114 to capture waste heat as shown, for example, in FIG. 14 with little to no additional resources (e.g., energy, costs, etc.) being introduced into the system.

Figure 15:
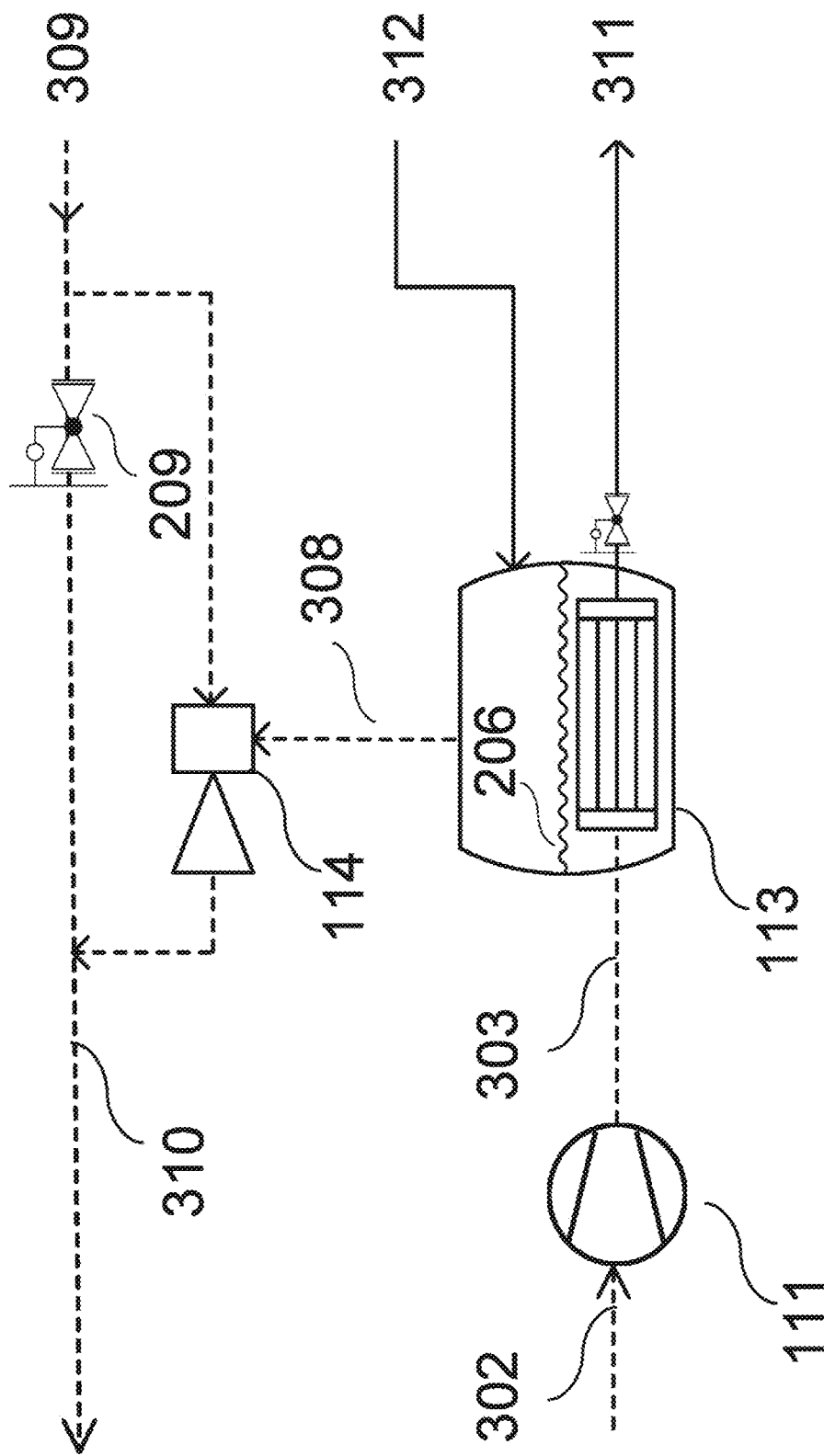
FIG. 15 shows an exemplary system in accordance with the invention where a compressor is utilized along with a jet ejector to recover heat.

In some embodiments of the present invention, jet ejectors and vapor re-compressors may both be utilized. As a non-limiting example, FIG. 15 shows a system utilizing vapor re-compressor 111 to compress a product stream 302 to higher pressure and temperature stream 303 prior to passage through re-boiler 113. With the higher input pressure and temperature, a higher pressure steam (up to about 0.6-1.0 bar) can be provided to jet ejector 114 through pathway 308 from the heated re-boiler water 206. As it can be challenging to achieve high amounts of compression in any given single step, carrying out the compression over multiple steps can lead to overall process efficiencies.

Figure 16:
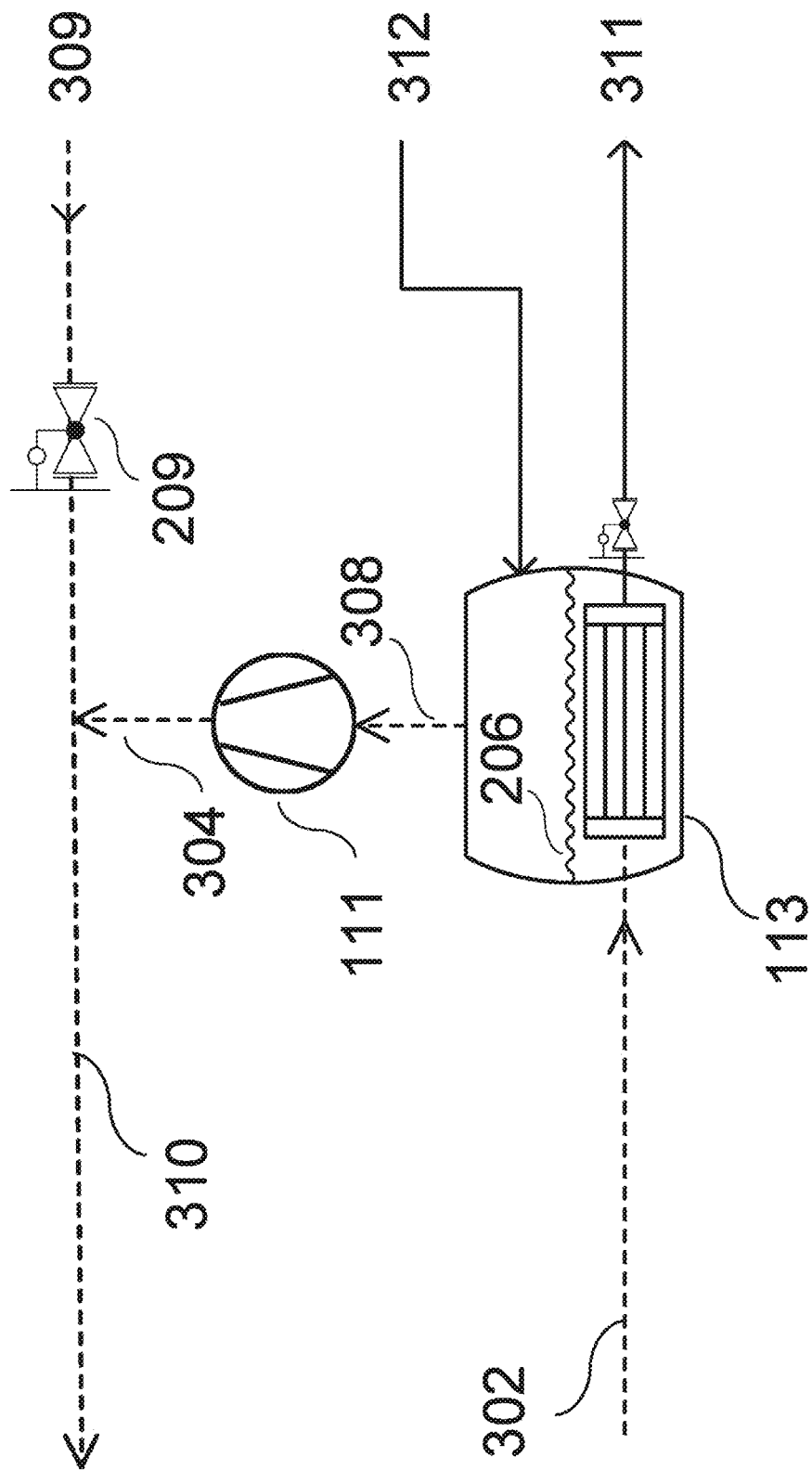
FIG. 16 shows an exemplary system in accordance with the invention where a compressor is utilized in a system with a source of high-pressure plant steam to recover heat.
Figure 17:
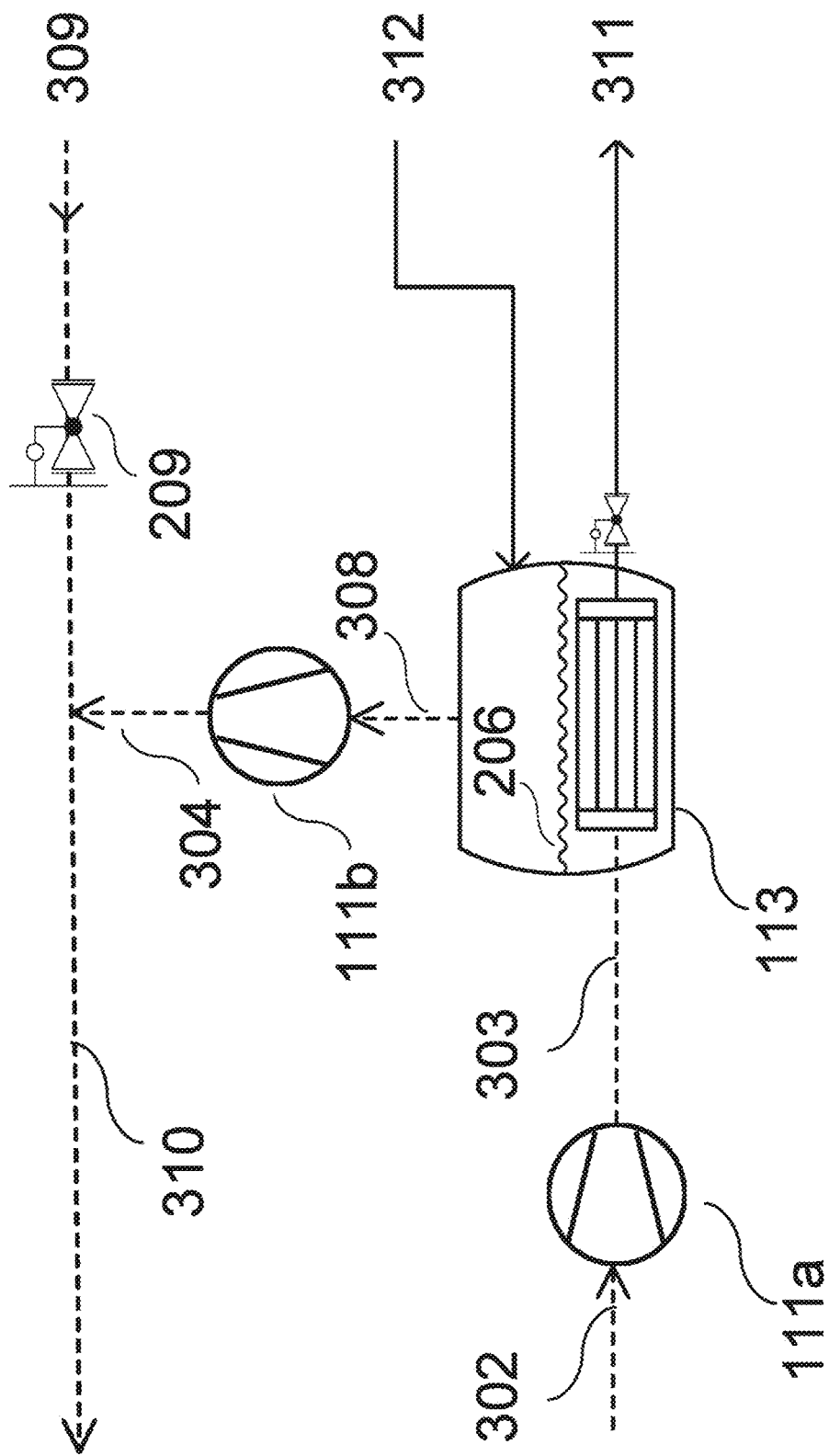
FIG. 17 shows an exemplary system in accordance with the invention where multiple compressors are utilized to recover heat.

In other exemplary embodiments, the jet ejector 114 in FIG. 14 or FIG. 15 can be replaced with a vapor re-compressor and utilized with a source of plant steam as shown in FIG. 16 and FIG. 17. In the exemplary embodiment shown in FIG. 16, the product stream of steam and $CO_2$ flowing out of one or more sorbent containers along path 302 flows through re-boiler 113, generating low-pressure steam (less than 1 bar and generally about 0.4-0.6 bar) from the water 206 present in the re-boiler. The low-pressure steam exits re-boiler 113 through pathway 308 to vapor re-compressor 111 where it is compressed to a higher pressure steam that passes through pathway 304 and back into process steam pathway 310. Pressure-sensing valve 209 adjusts the flow of high-pressure plant steam into process steam pathway 310 to maintain the desired process steam pressure.

The exemplary embodiment shown in FIG. 17, utilizes vapor re-compressor 111a to increase the pressure of a product stream 302 into re-boiler 113 along with a second vapor re-compressor 111b to increase the pressure of the recovered steam stream 304 injected back into the process steam stream 310. As in the embodiment shown in FIG. 16, pressure-sensing valve 209 adjusts the flow of high-pressure plant steam into process steam pathway 310 to maintain the desired process steam pressure.

Figure 18:
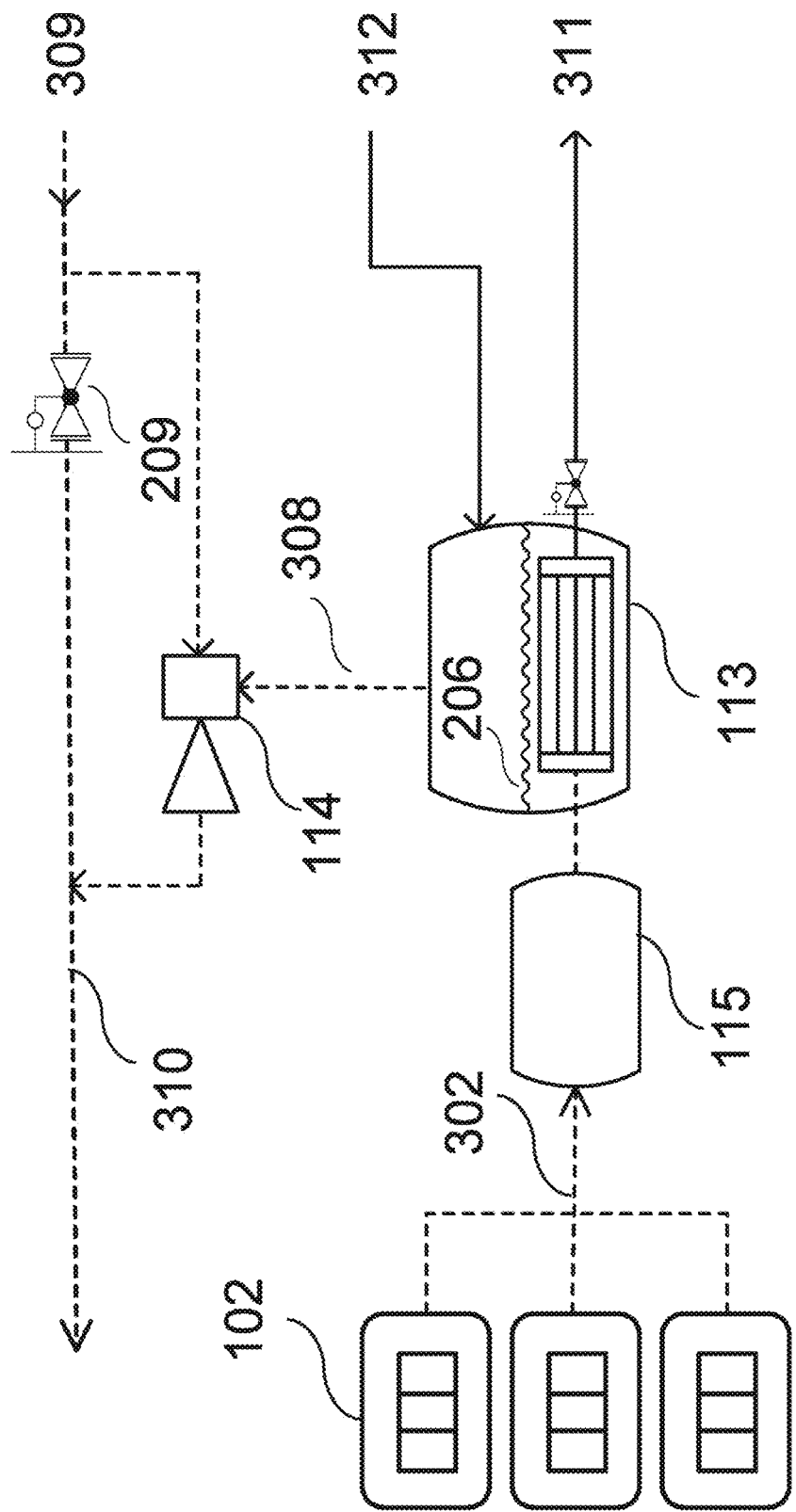
FIG. 18 shows an exemplary system in accordance with the invention where a jet ejector is utilized with an accumulator to recover heat in a steady-state continuous fashion.

The systems stagger the adsorption/desorption cycles, and manage the process control thereof, to achieve the most efficient processes and lower equipment costs. For example, managing the number of reactors undergoing simultaneous desorption can reduce the needed size of steam pipes and valves. In some embodiments of the present invention, steam streams or product streams from different sources may be combined and collected in accumulators that can then provide a more constant stream to feed downstream processes. As a non-limiting example embodiment, FIG. 18 shows the product streams 302 from multiple sorbent containers 102 being combined and collected in accumulator 115. The accumulator 115 can then more easily provide a steady and constant supply of the product stream to re-boiler 113 for product separation and heat recovery as described above. In other embodiments, accumulators are utilized to combine and collect the low-pressure steam exiting multiple re-boilers 113 to provide a steady and constant supply of the low-pressure steam to downstream jet-ejectors or vapor re-compressors.

As those skilled in the art will appreciate, numerous modifications and variations of the present invention are possible in light of these teachings, and all such are contemplated hereby. All of the references cited herein are incorporated by reference herein for all purposes, or at least for their teachings in the context presented.

The invention claimed is:

1. A method of capturing carbon dioxide ($CO_2$) from the atmosphere, the method comprising:
   circulating atmospheric air containing an ambient concentration of $CO_2$ over, through, or around a sorbent 103 provided within a sorbent container 102 that is capable of being hermetically sealed, wherein the sorbent 103 is configured to adsorb $CO_2$ from the atmospheric air;
   hermetically sealing the sorbent container 102 using valves (403, 404) when adsorption reaches a predetermined threshold;
   removing residual air from the sorbent container 102 by evacuating the sorbent container 102 using a vacuum pump 109;
   admitting process steam from an evaporator 101 through a pathway 310 into the sorbent container 102 to heat the sorbent 103 to a desired temperature, wherein steam leaves condensed water, steam vapor, and $CO_2$ within the sorbent container 102;
   purging the sorbent container 102 with additional process steam from the pathway 310 to desorb $CO_2$ from the sorbent and directing a resulting product stream comprising steam vapor and $CO_2$ out of the sorbent container 102 along a path 302 and into a re-boiler 113;
   using the re-boiler 113 to recover latent heat from the product stream, transfer the heat to convert cooling water in the re-boiler 113 to generate low-pressure steam which exits re-boiler 113 through a pathway 308 to a jet ejector 114, and create a cooled mixture of condensed steam and $CO_2$;
   directing the cooled mixture of condensed steam and $CO_2$ to exit the re-boiler 113 through a pathway 311 for further separation and processing;
   using a pressure-sensing valve 209 to direct a flow of high-pressure plant steam 309 through the jet ejector 114 to create a motive force to pull the low-pressure steam through the jet ejector 114 and into the pathway 310;
   stopping the purging of the sorbent container 102 and hermetically sealing the sorbent container 102 using the valves (403, 404) when desorption is complete;
   evacuating the sorbent container 102 with the vacuum pump 109 to evaporate condensed water and cool the sorbent 103 and the sorbent container 102 by evaporative cooling; and
   returning the sorbent container 102 to atmospheric pressure after it has been cooled to a desired temperature to complete one cycle.

2. The method of claim 1,
   wherein the process steam and the additional process steam are each provided at a pressure ranging from 0.8 bar to 1.3 bar, and
   wherein the high-pressure plant steam 309 has a pressure higher than about 4 bar.

3. The method of claim 2, wherein the residual air is removed from the sorbent container 102 by evacuating the sorbent container 102 to a pressure ranging from 0.05 bar to 0.3 bar.

4. The method of claim 3, wherein the evaporative cooling cools the sorbent container 102 and the sorbent 103 to a temperature of about 50° C. to 80° C.

5. The method of claim 4, wherein the evaporative cooling includes a liquid cooling spray that is injected into the sorbent container 102.

6. The method of claim 1, further comprising:
   passing the product stream through a vapor re-compressor 111 to increase the temperature and pressure of the product stream prior to passing it through path 302 and into the re-boiler 113.

7. The method of claim 6,
   wherein the process steam and the additional process steam are each provided at a pressure ranging from 0.8 bar to 1.3 bar, and
   wherein the high-pressure plant steam 309 has a pressure higher than about 4 bar.

8. The method of claim 7, wherein the residual air is removed from the sorbent container 102 by evacuating the sorbent container 102 to a pressure ranging from 0.05 bar to 0.3 bar.

9. The method of claim 8, wherein the evaporative cooling cools the sorbent container 102 and the sorbent 103 to a temperature of about 50° C. to 80° C.

10. The method of claim 9, wherein the evaporative cooling includes a liquid cooling spray that is injected into the sorbent container 102.

11. The method of claim 1, further comprising:
   collecting the product stream from the sorbent container 102 and one or more second product streams from one or more second sorbent containers;
   combining the product stream with the one or more second product streams from the one or more second sorbent containers in an accumulator 115 to create a resulting combined product stream; and
   using the accumulator to provide the resulting combined product stream in a steady and constant supply to the re-boiler 113.

12. The method of claim 11,
   wherein the process steam and the additional process steam are each provided at a pressure ranging from 0.8 bar to 1.3 bar, and
   wherein the high-pressure plant steam 309 has a pressure higher than about 4 bar.

13. The method of claim 12, wherein the residual air is removed from the sorbent container 102 by evacuating the sorbent container 102 to a pressure ranging from 0.05 bar to 0.3 bar.

14. The method of claim 13, wherein the evaporative cooling cools the sorbent container 102 and the sorbent 103 to a temperature of about 50° C. to 80° C.

15. The method of claim 14, wherein the evaporative cooling includes a liquid cooling spray that is injected into the sorbent container 102.

\* \* \* \* \*